Oct. 28, 1941.  J. B. WHITTED  2,260,497
LUBRICATING SYSTEM AND APPARATUS
Filed Aug. 9, 1939  16 Sheets-Sheet 1
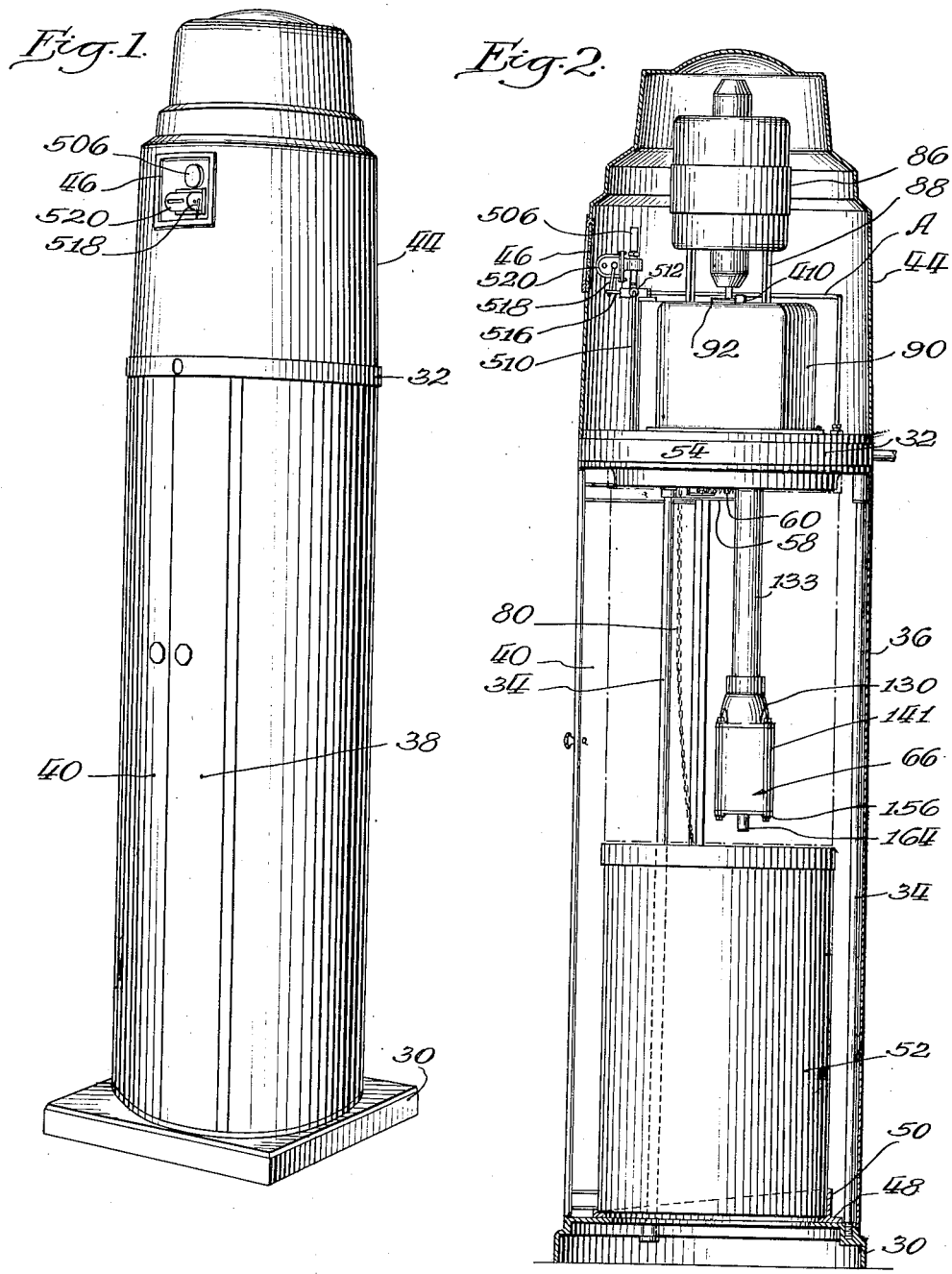
Inventor
John B. Whitted
By Williams, Bradbury,
McCaleb & Hinkle.
Attys.

Oct. 28, 1941.   J. B. WHITTED   2,260,497
LUBRICATING SYSTEM AND APPARATUS
Filed Aug. 9, 1939   16 Sheets-Sheet 2
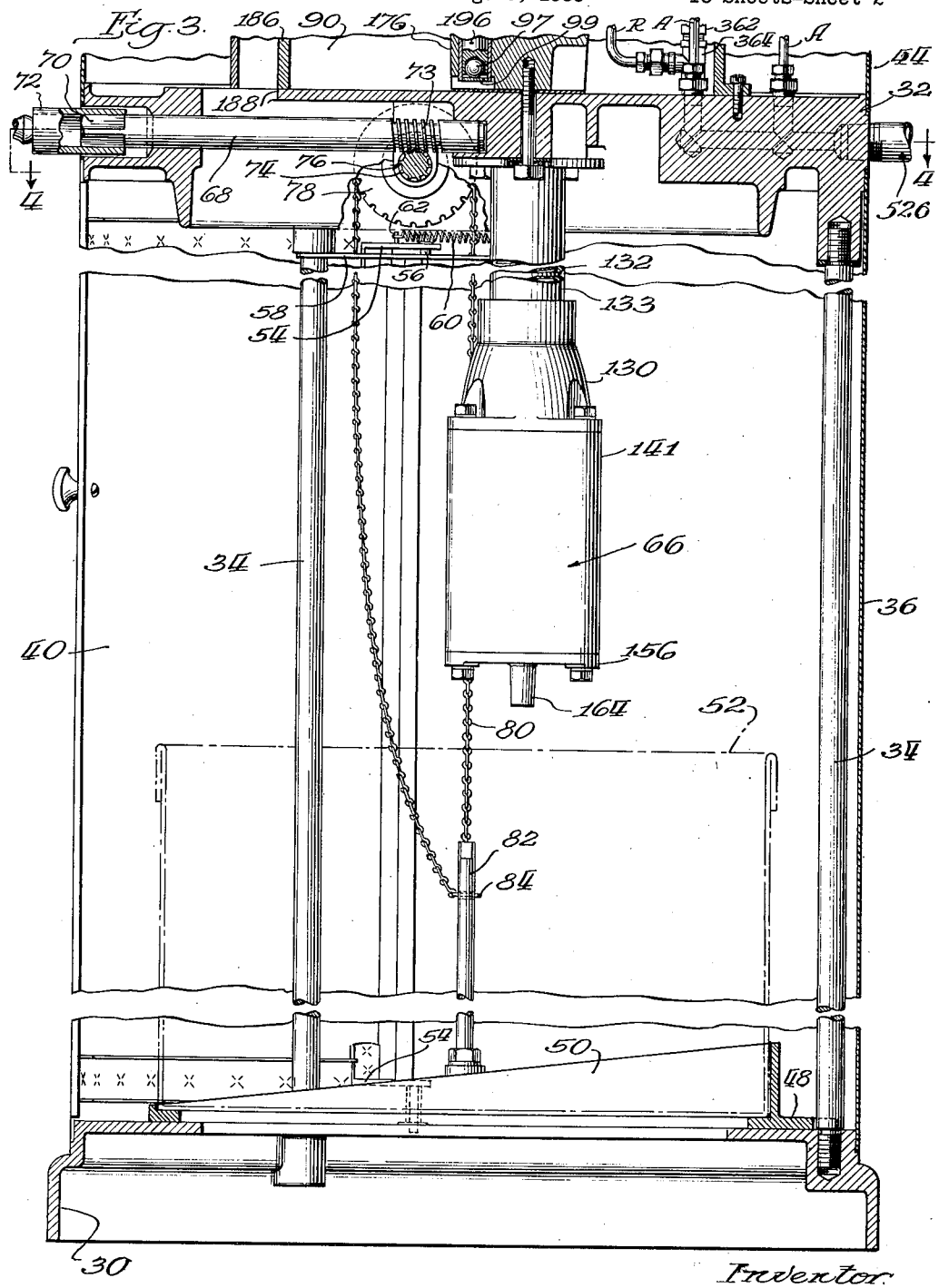
Inventor.
John B. Whitted
By
Williams, Bradbury, McCaleb & Hinkle
Attys.

Oct. 28, 1941.   J. B. WHITTED   2,260,497
LUBRICATING SYSTEM AND APPARATUS
Filed Aug. 9, 1939   16 Sheets-Sheet 3

Inventor:
John B. Whitted
By Williams, Bradbury,
McCaleb & Hinkle
Attys.

Oct. 28, 1941.　　　J. B. WHITTED　　　2,260,497
LUBRICATING SYSTEM AND APPARATUS
Filed Aug. 9, 1939　　　16 Sheets-Sheet 4

Inventor:
John B. Whitted
By Williams, Bradbury,
McCaleb & Hinkle
Attys.

Oct. 28, 1941.    J. B. WHITTED    2,260,497
LUBRICATING SYSTEM AND APPARATUS
Filed Aug. 9, 1939    16 Sheets-Sheet 8
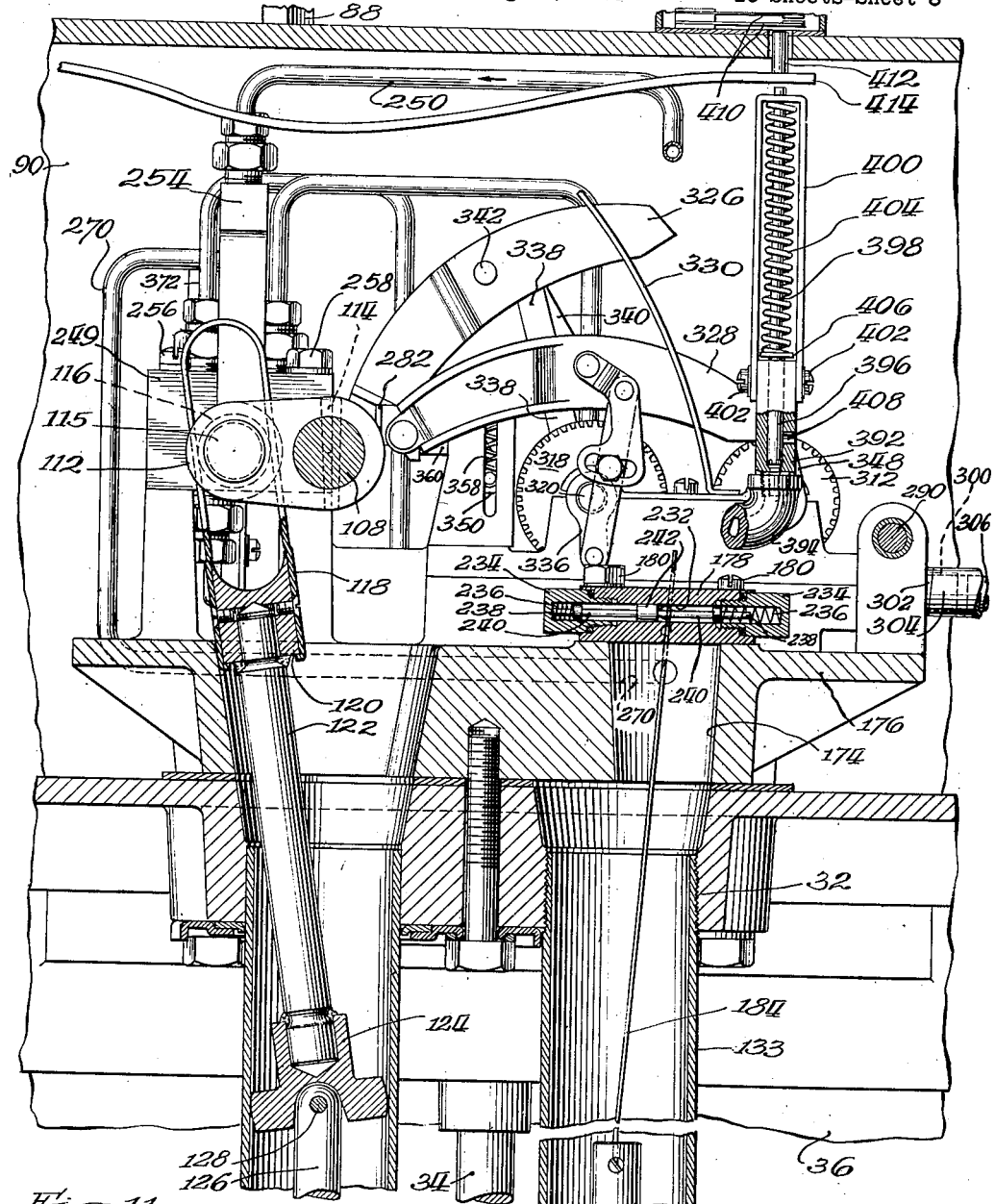
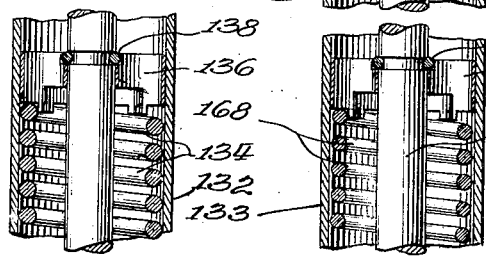
Fig. 11.
Inventor
John B. Whitted
By Williams, Bradbury,
McCaleb & Hinkle
Attys.

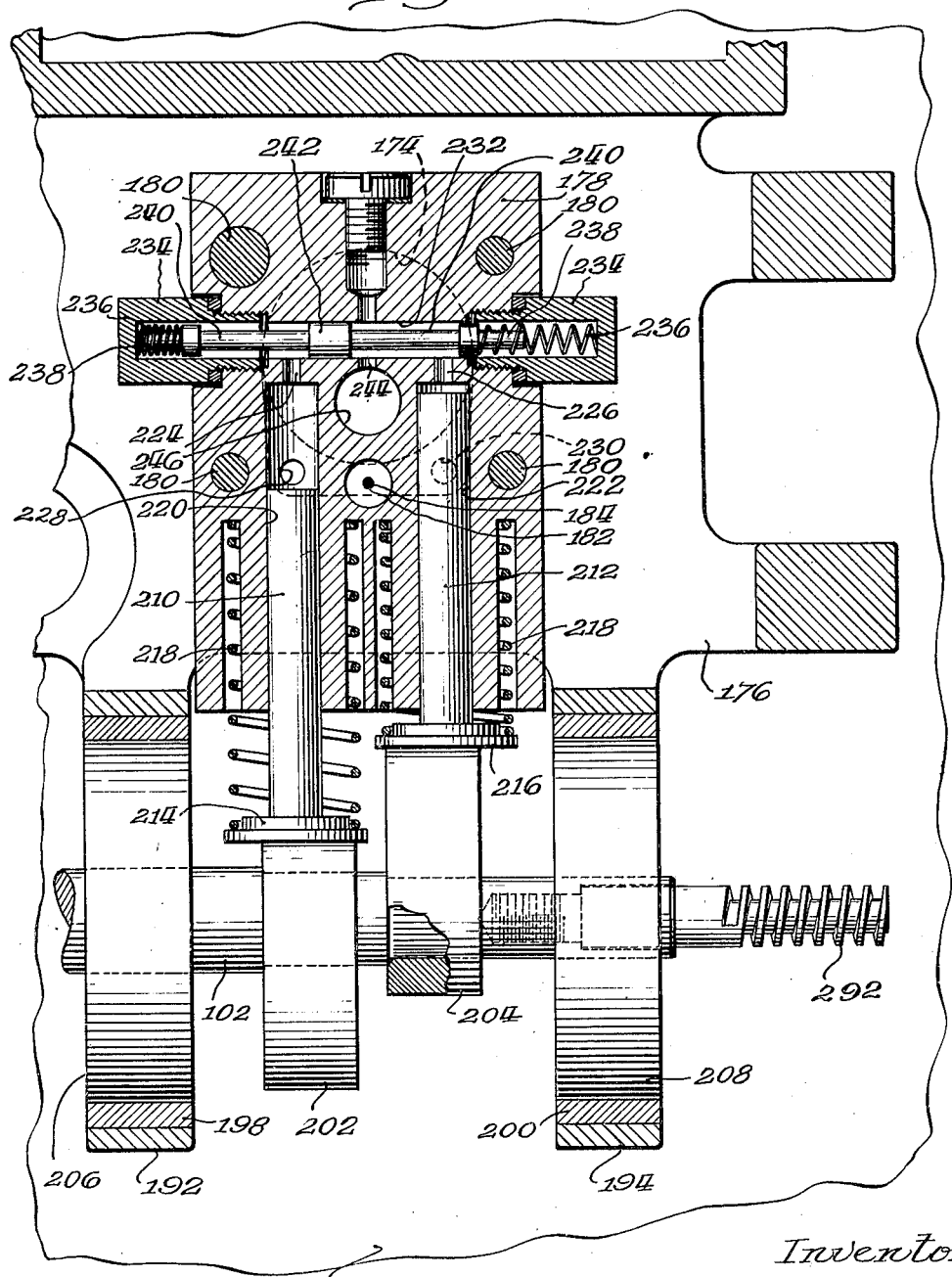

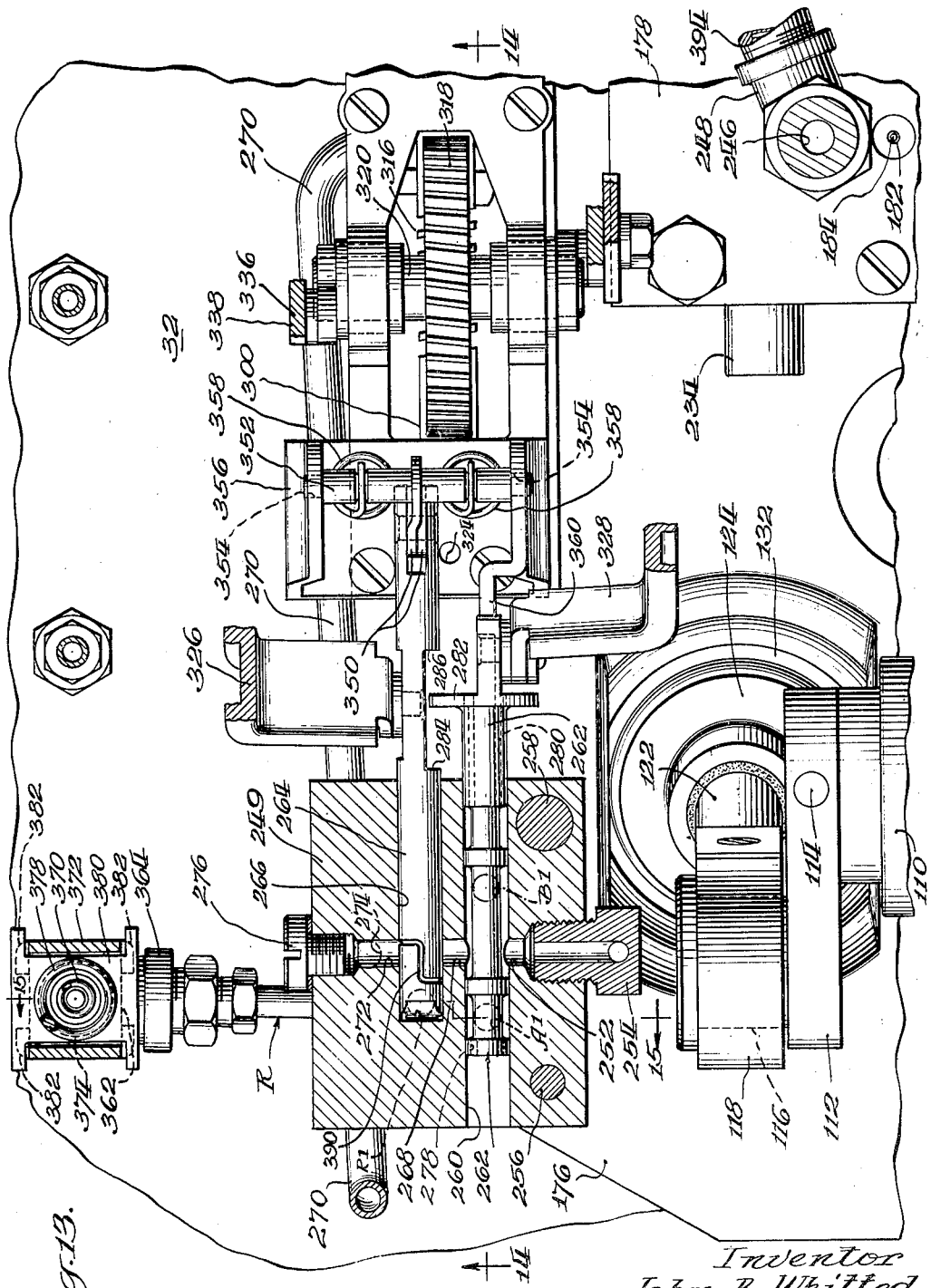

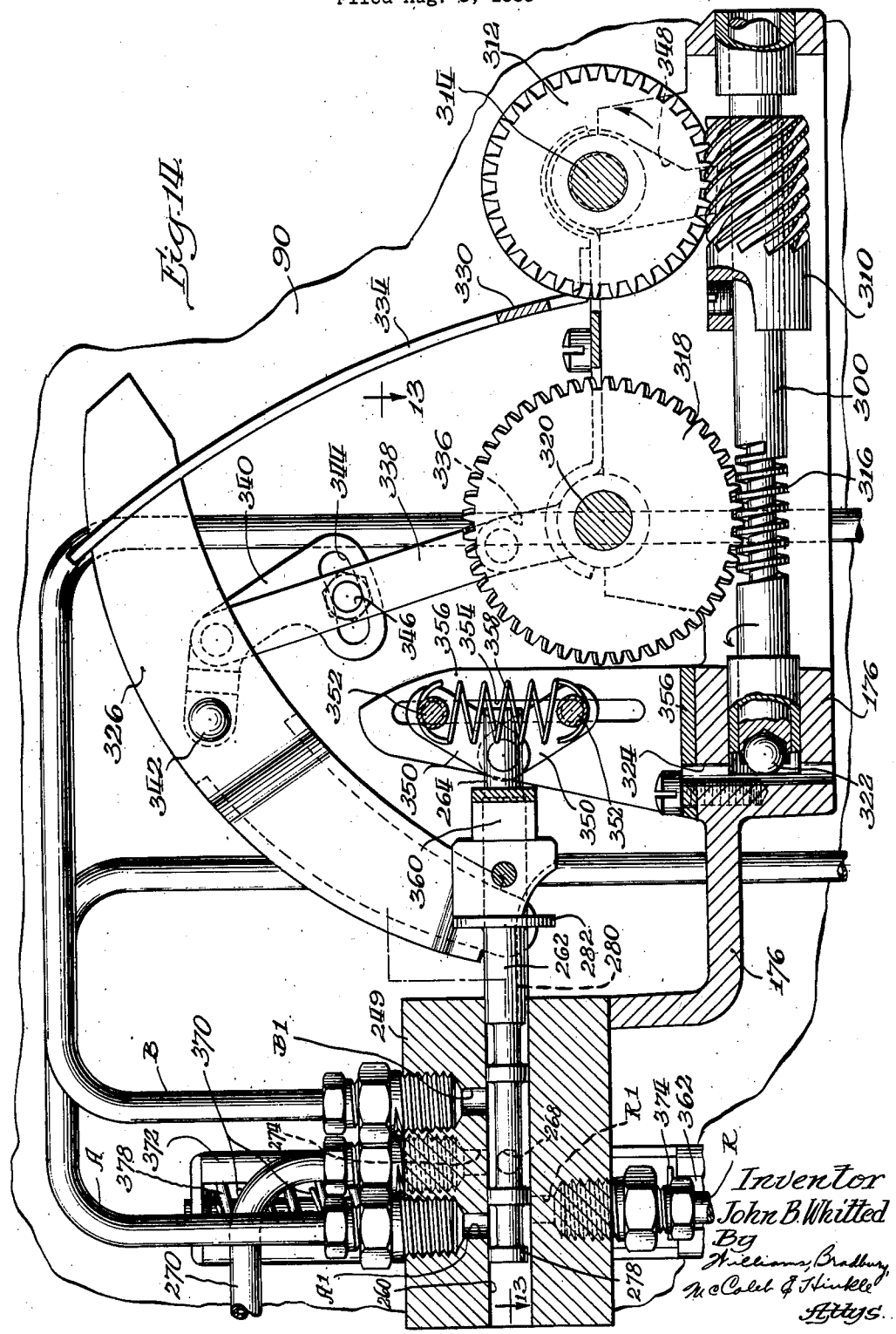

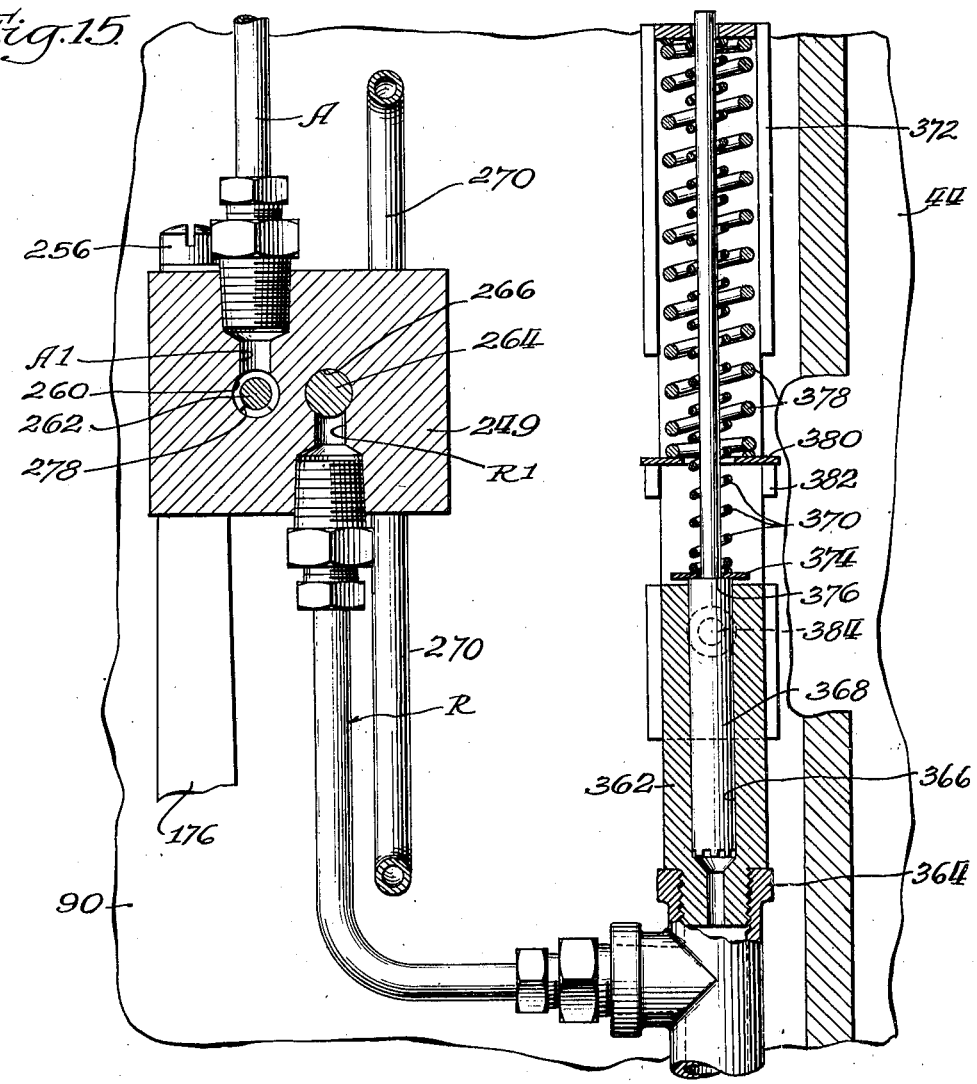

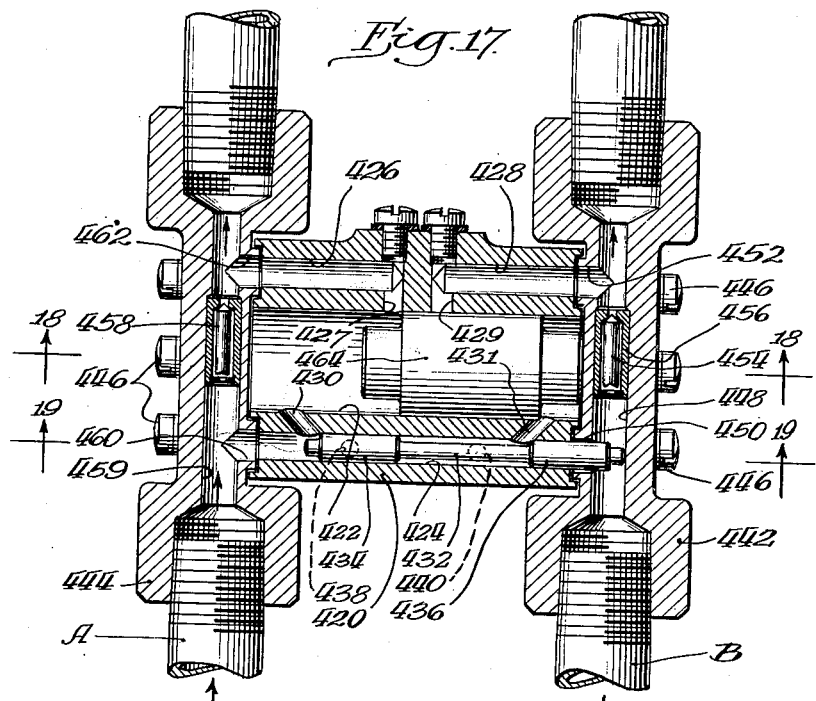
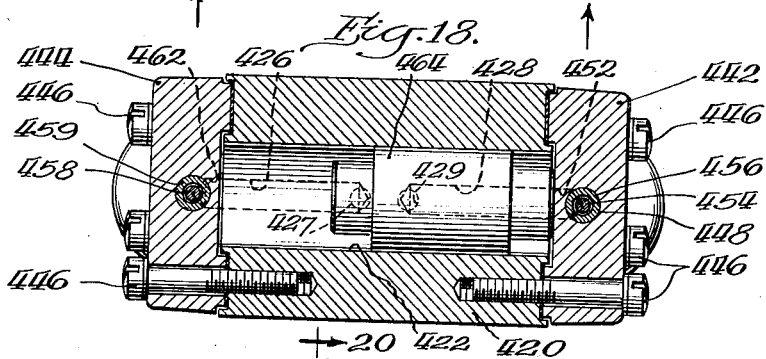
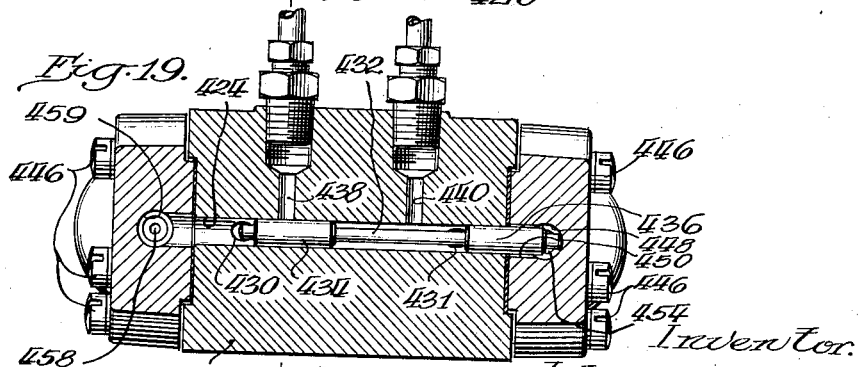

Oct. 28, 1941.   J. B. WHITTED   2,260,497
LUBRICATING SYSTEM AND APPARATUS
Filed Aug. 9, 1939   16 Sheets-Sheet 14
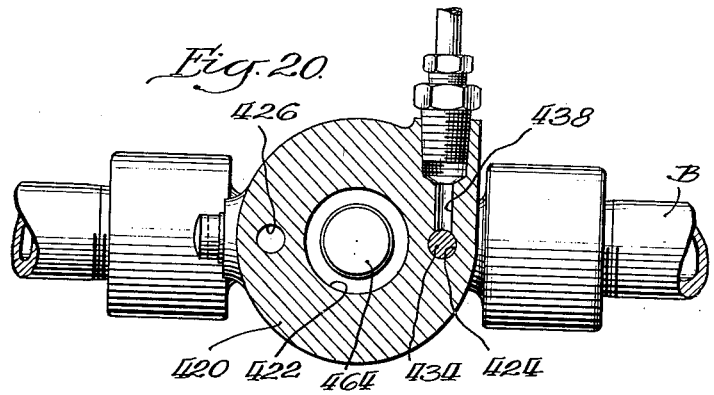
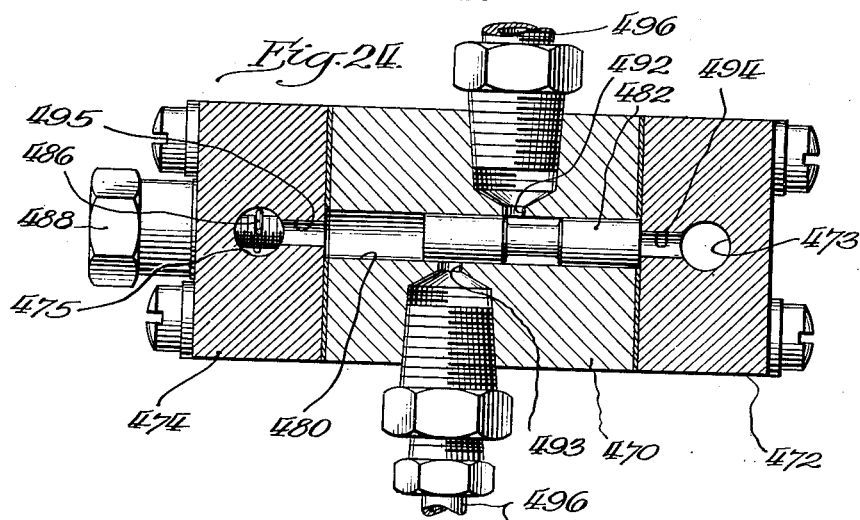
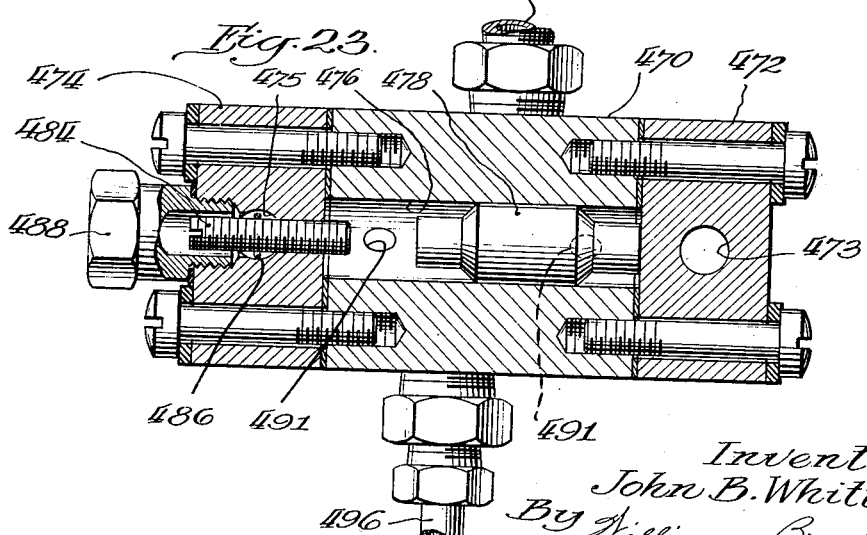
Inventor:
John B. Whitted

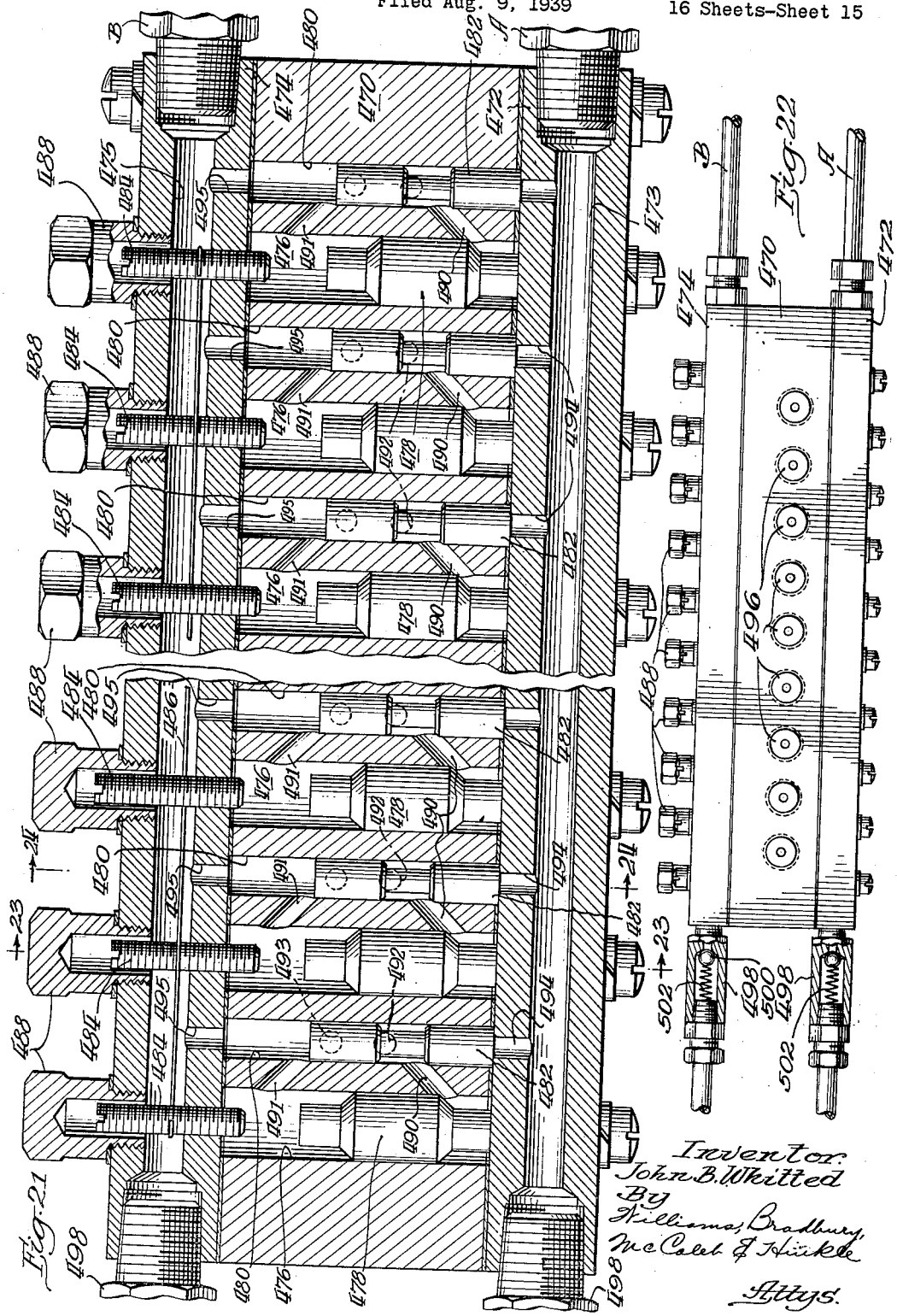

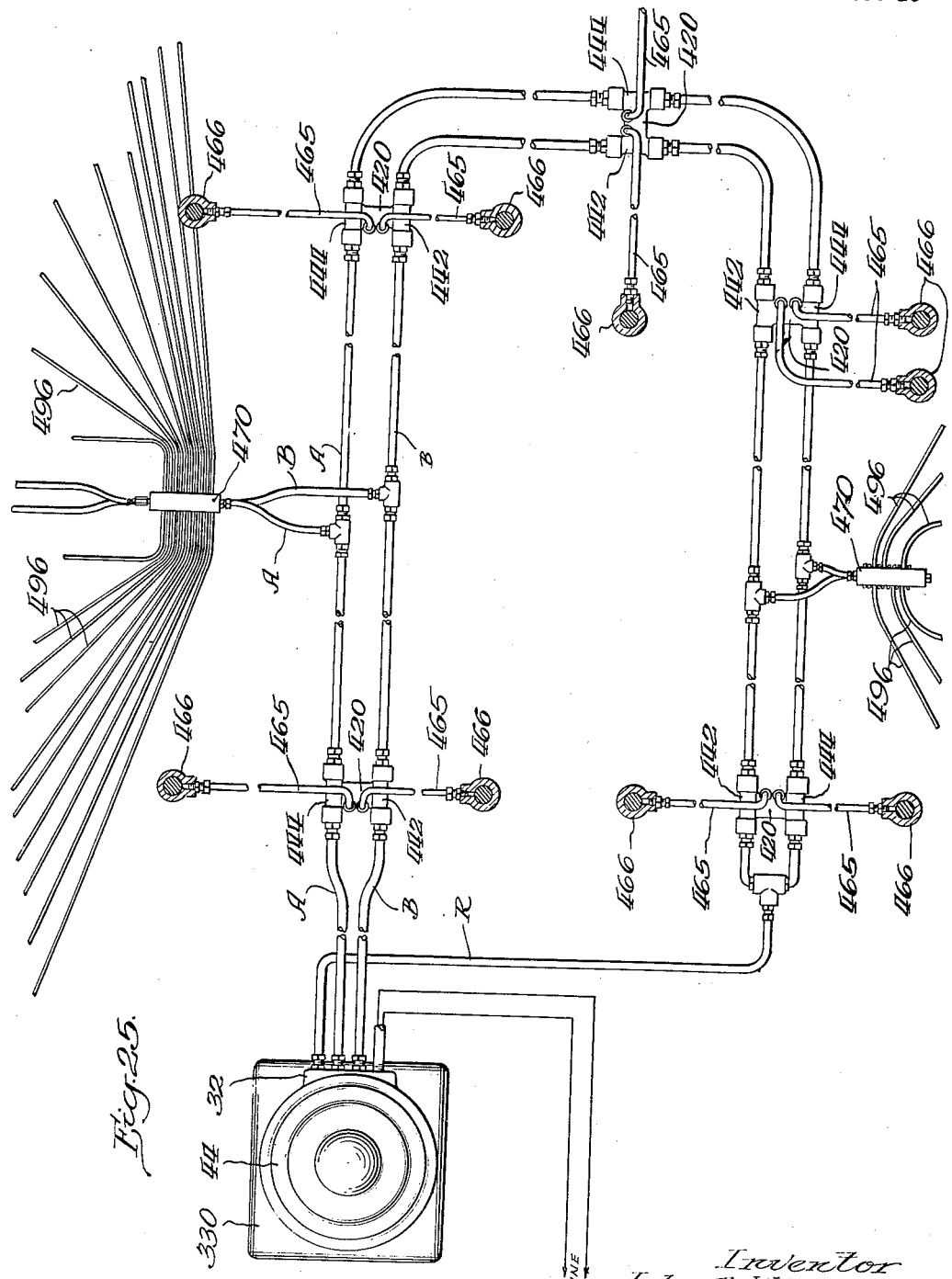

Patented Oct. 28, 1941

2,260,497

UNITED STATES PATENT OFFICE 2,260,497

LUBRICATING SYSTEM AND APPARATUS

John B. Whitted, Glencoe, Ill., assignor to Stewart-Warner Corporation, Chicago, Ill., a corporation of Virginia Application August 9, 1939, Serial No. 289,227

11 Claims. (Cl. 184—7)

My invention relates generally to a lubricating system and apparatus for the periodic lubrication of a large number of bearings, such, for example, as those found on a large machine tool, or a plurality of such machines.

The system may be made of adequate capacity to lubricate the machinery in one section or floor of a factory, or may be made individual to a single machine or group of machines. It is likewise applicable to railroad rolling stock, and in modified form to the lubrication of automotive and marine machinery installations.

Briefly, the system comprises a lubricant compressor or pumping mechanism with improved means enabling the withdrawal of relatively viscous lubricants from the original containers, supplying the lubricant under pressure through a conduit system to which lubricant metering devices are connected, the metering devices feeding lubricant to the bearings to which they are attached or connected by conduit, and automatically controlling the compressor by means of a hydraulic system responsive to pressure in a return line from the metering devices. The connections between the pressure line, metering devices, and return line are such that the metering devices operate seriatim, and thus the operation of each of the metering devices is assured before hydraulic pressure is available at the return inlet of the compressor to control the operation of the latter. While the lubricant transmission conduits have been spoken of as the pressure line and return line, such designation is not strictly accurate, since each of the conduits alternately functions as a pressure line and a return line.

The system is entirely positive in operation so that the ejection of an accurately measured charge to each of the bearings to be supplied with lubricant is assured upon each periodic operation of the compressor. The periodicity of the intervals between initiation of operation of the compressor may be controlled, thus governing the frequency with which the bearings are lubricated.

Several novel forms of metering devices are employed in the system, and in one of the forms the amount of the discharge of the devices for each operation of the compressor may be readily adjusted.

The apparatus is provided with suitable signaling mechanisms and controls so as to assure uninterrupted operation and to provide indications of deviations from the normal operation of the system.

It is thus an object of my invention to provide an improved centralized lubricating system which is capable of performance above described, which is durable in construction, may be economically manufactured, is sufficiently flexible to be adaptable to various installation requirements, which is substantially fully automatic, and requires little attention on the part of the machine operator.

Other objects will appear from the following description, reference being had to the accompanying drawings, in which:

Figure 1 is a perspective view of the compressor unit of the system;

Figure 2 is a longitudinal sectional view of the compressor housing, showing the major parts of the compressor in elevation;

Figure 3 is a vertical sectional view taken on the line 3—3 of Figure 4, showing particularly the lubricant drum elevating mechanism;

Figure 11 is a vertical sectional view taken, except for the showing of the upper portion of wire 184 and the priming pumping mechanism, on the line 11—11 of Figure 9, showing the compressor drive mechanism and also portions of the timing control apparatus in elevation and in fragmentary section;

Figure 12 is a horizontal sectional view taken on the line 12—12 of Figure 10, showing the hydraulically energized valve operating mechanism;

Figure 13 is a horizontal sectional view taken on the line 13—13 of Figure 14, showing further details of the hydraulically energized valve operating mechanism;

Fig. 14 is an enlarged elevational view taken on the line 14—14 of Figure 9, showing parts of the timing and valve operating mechanism, portions thereof being illustrated in fragmentary section;

Figure 15 is a fragmentary sectional view taken on the line 15—15 of Figure 9, showing portions of the pressure responsive control valve mechanism;

Figure 16 is a sectional view taken on the line 16—16 of Figure 8, showing the control valve for the pressure gauge and the operator for an indicator;

Figure 17 is a longitudinal sectional view of an improved form of metering device or measuring valve;

Figure 4:
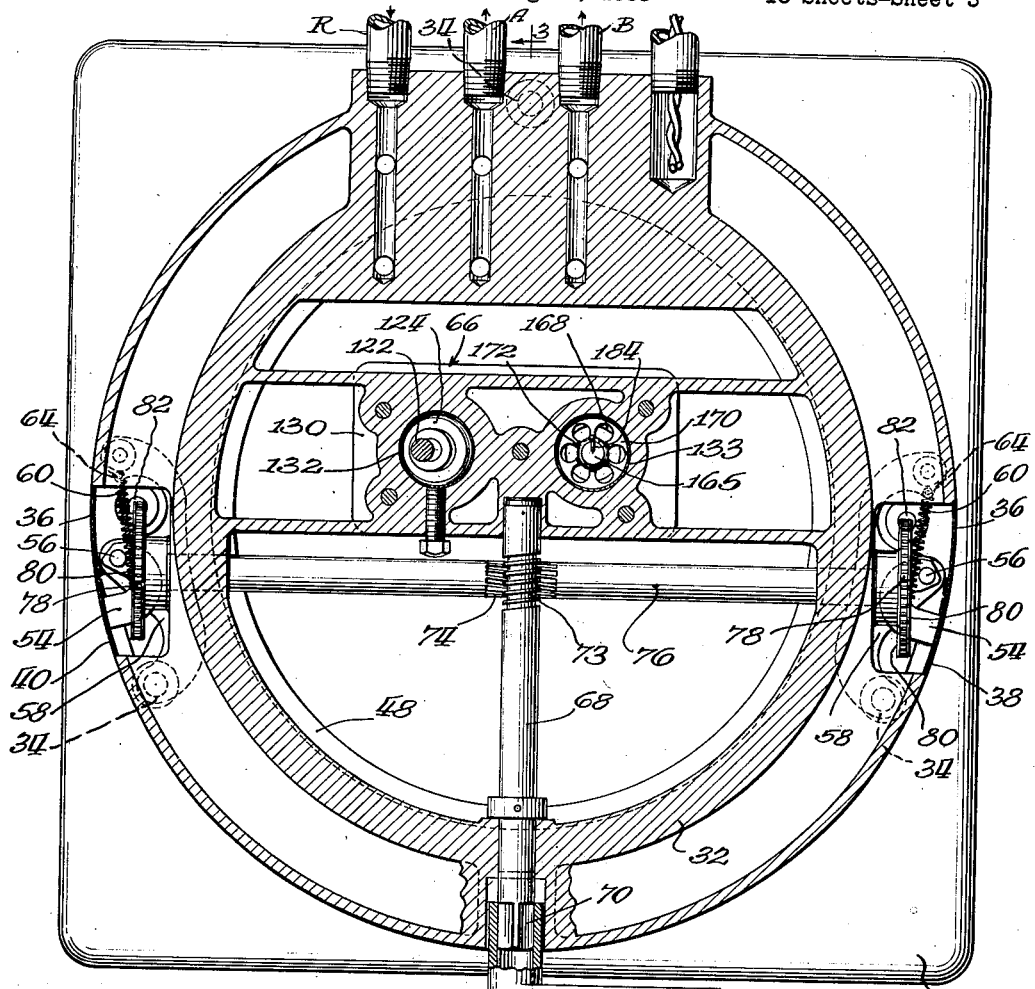
Figure 4 is a transverse sectional view taken on the line 4—4 of Figure 3.

Figures 18 and 19 are transverse sectional views of the metering device taken on lines 18—18 and 19—19, respectively, of Figure 17;

Figure 20 is a transverse sectional view taken on the line 20—20 of Figure 19;

Figure 21 is a longitudinal sectional view of a multiple unit metering device assembly in which the discharge capacities of each of the units is individually adjustable;

Figure 22 is a plan view of the multiple unit measuring device of Figure 21, showing the outlet check valves in fragmentary section;

Figures 23 and 24 are transverse sectional views of the multiple unit measuring devices taken on the lines 23—23 and 24—24, respectively, of Figure 21; and Figure 25 is a diagrammatic view of a representative installation of the complete lubricating system.

The compressor assembly is mounted in a unitary casing with the lubricant supply drum and, as shown particularly in Figures 1 to 5, the casing comprises a base casting 30 and a compressor supporting casting or frame 32 connected by a plurality of supporting column rods 34 which are threaded, respectively, in suitable bosses formed in the castings 30 and 32. The housing proper comprises a shell 36, extending through approximately 190 degrees of the circumference of the housing, and a pair of doors 38 and 40. The compressor mechanism which is mounted upon the casting 32 is enclosed by a suitable dome-shaped housing 44 which is provided with a window 46 through which the pressure gauge and other indicators, showing the operation of the compressor, may be observed.

A drum support 48 is guided for vertical movement within the housing by the vertical column rods 34, the support having a flange 50 to center a drum 52. The flange 50 is sloped toward the front of the housing so as to facilitate the removal and replacement of drums upon the support 48. The support 48 and the housing are of size to receive a commercial lubricant drum in which the lubricant is customarily shipped and sold. By designing the system to receive the container in which the lubricant is shipped, a great deal of time, which would otherwise be expended in transferring the lubricant from the shipping drum to the reservoir of the compressors, is saved.

Figure 5:
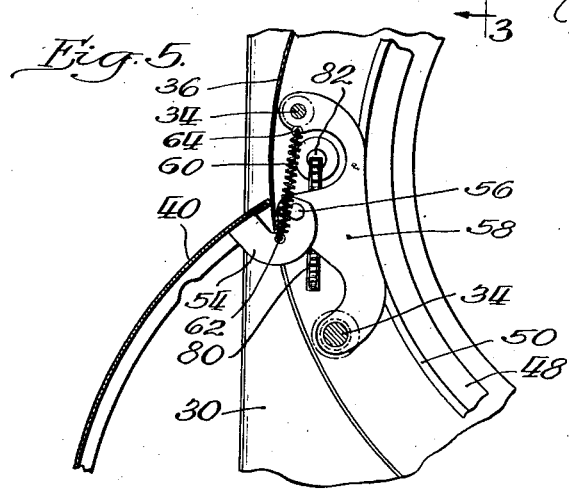
Figure 5 is a fragmentary sectional view showing the housing door spring hinge construction.
Figure 6:
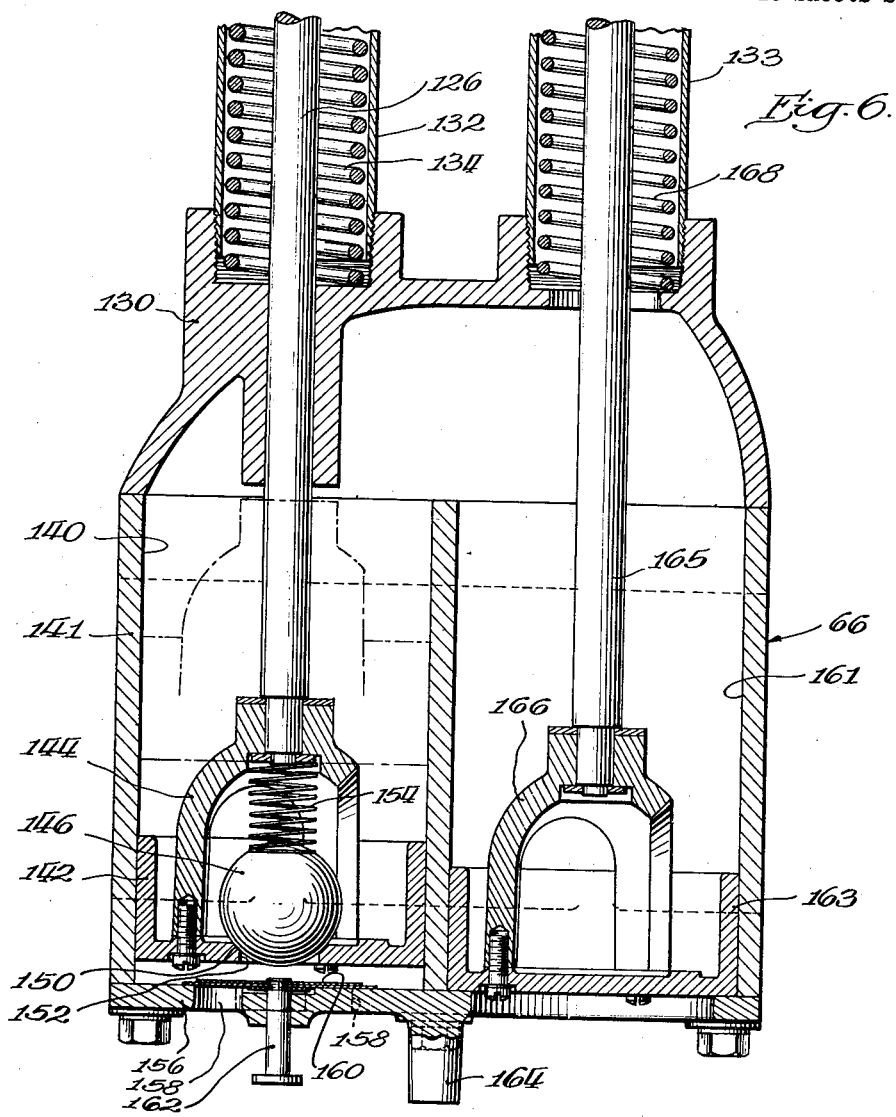
Figure 6 is a vertical sectional view taken on the line 6—6 of Figure 7, showing the compressor piston and cylinder and pressure control piston and cylinder.
Figure 7:
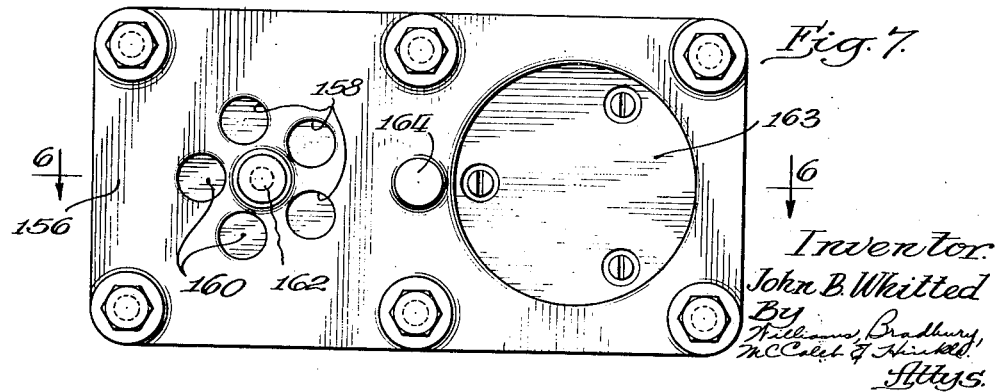
Figure 7 is a bottom plan view of the compressor structure shown in Figure 6.

To facilitate the removal and replacement of drums, the doors 38 and 40 are hinged, as shown in Figure 5, from which it will be seen that the door 40 is provided with a hinge bracket 54 pivoted on a pintle 56, the latter being carried by a bracket 58 supported upon rods 34. A tension spring 60 has one end anchored to a pin 62 on the bracket 54 and its other end secured to a pin 64 on the fixed bracket 58. It will be apparent from Figure 5 that the spring 60 is effective to hold the door 40 in open position as shown, and is likewise effective to hold the door in closed position, since, in moving from one position to the other, the axis of the spring passes through the axis of the pintle 56, and the spring is thus stretched the maximum extent when the door is approximately half way open. It will be understood that each of the doors 38 and 40 will be provided with a pair of the hinges such as shown in Figure 5, and that the spring hinges are thus effective to hold the doors open when they are moved to open position and to hold them closed when they are moved to closed position.

As shown in Figure 2, the priming pump mechanism, designated generally as 66, is located above the top of the drum when the latter is placed upon its support 48, with the latter in its lowermost position. Means are therefore provided to raise the drum so as to plunge the priming pump mechanism into the lubricant contained in the drum so that the inlet of this mechanism will be adjacent the bottom of the drum and thus enable substantially complete removal of the lubricant contained in the drum. This elevating mechanism comprises a worm shaft 68 (Figure 4) having a square end 70 for engagement by a square socket crank 72. The shaft 68 is mounted in suitable bearings formed in the upper frame casting 32 and has a worm 73 cut therein for engagement with worm wheel teeth 74 formed on a sprocket shaft 76 which is rotatable in suitable bearings formed in the casting 32. A sprocket 78 is secured at each end of the shaft 76 for a chain 80, one end of which is secured to a vertical post 82 threaded in the support 48, and the other end of which is attached to said post 82 by a cotter pin 84. With this drum elevating arrangement, the attendant, upon placing a drum upon the support 48, inserts the crank 72 in the socket provided therefor and in engagement with the end of the shaft 68. Upon rotation of the crank, the support 48, together with the drum resting thereupon, will be raised until the lower end of the priming pump mechanism 66 engages the bottom of the drum.

Figure 8:
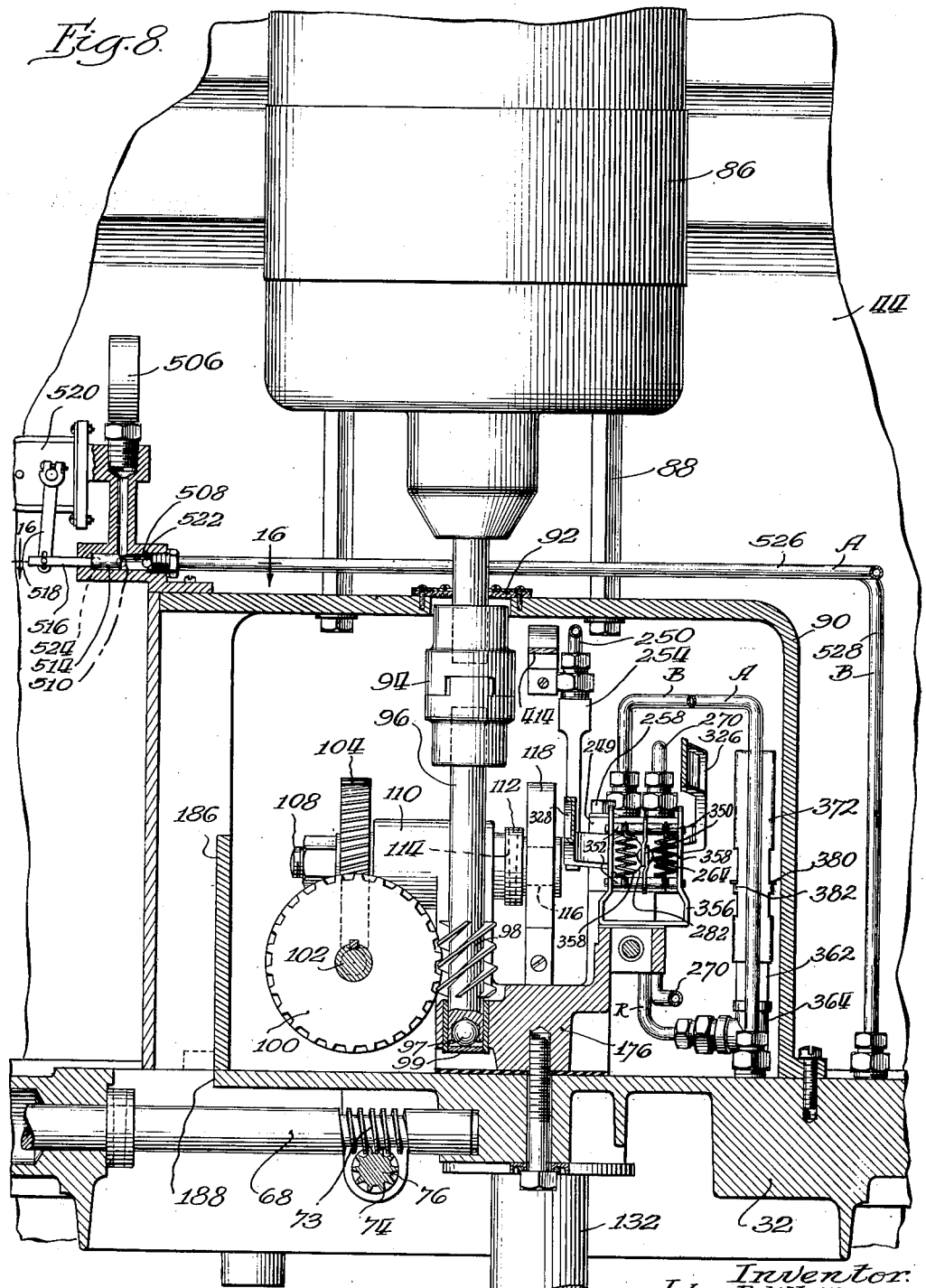
Figure 8 is a fragmentary vertical sectional view taken on the line 8—8 of Figure 9, showing the compressor drive and associated control mechanism.

The priming pump mechanism, as best shown in Figures 3, 6, 7, and 11, is driven by an electric motor 86 mounted upon standards 88 carried upon a frame 90 which is secured to the casting 32 (Fig. 8). The drive shaft of the motor 86 extends through a sealing gland 92, and is connected by a flexible coupling 94 with a worm drive shaft 96 having a worm 98 thereon. The worm shaft 96 has its end recessed to receive a ball bearing 97 which, together with a plate 99, forms an end thrust bearing for the shaft. The worm 98 meshes with a worm wheel 100 keyed to a countershaft 102 which drives a worm gear 104 through a worm 106 (Figs. 9 and 10) formed on the shaft. The worm gear 104 is secured to a crank shaft 108 journaled in a bearing 110 and which has a crank 112 non-rotatably secured thereto by a taper pin 114. The crank 112 carries a pin 115 (Fig. 11) which has a roller 116 which rides within the elongated opening formed by a strap 118 secured to a connecting rod head 120, the latter being welded or otherwise suitably secured to a connecting rod 122. The lower end of the connecting rod 122 has a fitting 124 secured thereto, as by welding, and is pivoted to a piston rod 126 by a pin 128. The piston rod 126 (Figures 6 and 11) is mounted for longitudinal reciprocation in a pump body casting 130, the latter being secured to the base casting 32 by pipes 132 and 133, which are threaded in suitable bosses formed upon the pump casting 130 and upon the base casting 32 respectively. The piston rod 126 is normally moved to its uppermost position by a compression coil spring 134 which is positioned within the pipe 132 and is compressed between the pump casting 130 and a spring seat spider 136 which abuts against a split ring collar 138, which rests partially within a suitable groove formed in the piston rod 126.

A low pressure pump cylinder 140 is formed within the pump cylinder casting 141 and has a piston 142 reciprocable therein. The piston 142 is secured to the end of the piston rod 126 by a combined yoke and check valve cage 144. Within the cage 144 is a ball check valve 146 which is pressed against a piston valve seat 150, formed about an opening 152 located in the face of the piston 142, by a coil spring 154 compressed between the ball check valve 146 and the interior of the cage 144. The lower end of the pump cylinder casting 141 is closed by a plate 156 which has inlet openings 158 formed therein, the inlet openings being normally closed by an inlet check valve 160 which is guided by a check valve pin 162. The lower plate 156 has a foot projection 164 which forms a stop engageable with the bottom of the lubricant drum to assure sufficient clearance between the base plate 156 and the bottom of the drum so that lubricant may flow readily into the inlet ports 158.

From the above description, it will be apparent that as the crank shaft 108 is rotated by the motor 86, the crank pin roller 116 will engage the connecting rod end fitting 120 and move the piston 142 downwardly against the pressure of the compression coil spring 134. During the downward travel of the piston 142, the lubricant trapped between the lower face of the piston and the plate 156 will be forced past the check valve 146. Upon the upward arcuate movement of the crank pin 114, the spring 134 will place the lubricant in the cylinder 140 above the piston 142 under pressure, and at the same time a fresh charge of lubricant will be drawn into the lower end of the cylinder past the check valve 160. If the discharge from the upper end of the cylinder 140 is cut off, it will be apparent that the lubricant pressure therein will hold the piston in its lowermost position against the force of the spring 134 so that the crank pin 114 will ride idly in the crank pin slot formed by the strap 118. Thus a load is put upon the driving motor 86 only when the flow of lubricant from the upper end of the cylinder 140 makes it necessary to reciprocate the piston 142 in order to maintain the lubricant in the upper end of the cylinder 140 under the proper priming pressure.

The upper end of the cylinder 140 is in direct communication with an accumulator cylinder 161 which is formed in the cylinder casting 141 adjacent the cylinder 140. A solid piston 163 is freely reciprocable in the cylinder 161 and is connected to a piston stem 165 by a yoke 166. The piston 163 is normally held in its uppermost position by a compression coil spring 168 located in the pipe 133, and the upper end of which engages a spider 170 which abuts against a split ring collar 172 which rests partially within a suitable groove formed in the upper end of a piston stem 165. The cylinder 161 thus forms a pressure accumulator capable of retaining a considerable charge of lubricant under sufficiently high pressure properly to prime the high pressure pumps to be described hereinafter, the lubricant being forced upwardly through the pipe 133 by the force of the spring 168 applied through the piston 163. The upper end of the pipe 133 communicates with a passageway 174 formed in a mounting block casting 176. A high pressure pump cylinder block 178 is secured over the opening 174 by a plurality of cap screws 180. The block 178 has a generally vertical hole 182 (Fig. 12) extending therethrough to provide a vent for air which may become entrapped with the lubricant. A relatively stiff wire 184 is secured to the accumulator piston stem 165 and projects through the passageway 182, leaving sufficient clearance around the wire to permit the escape of air from the passageway 174. Since, during normal operation of the apparatus, the piston stem 165 will move up and down periodically, the wire will be reciprocated in the passageway 182 and, by its motion, cause the passageway to remain free of obstructions. Of course some lubricant will escape through the passageway 182, but this lubricant will merely serve effectively to lubricate various pump operating mechanisms contained within the housing 90 (Figure 8), and the surplus lubricant will flow over a dam 186 and thence return to the lubricant drum through a port 188 formed in the base casting 32.

Figure 10:
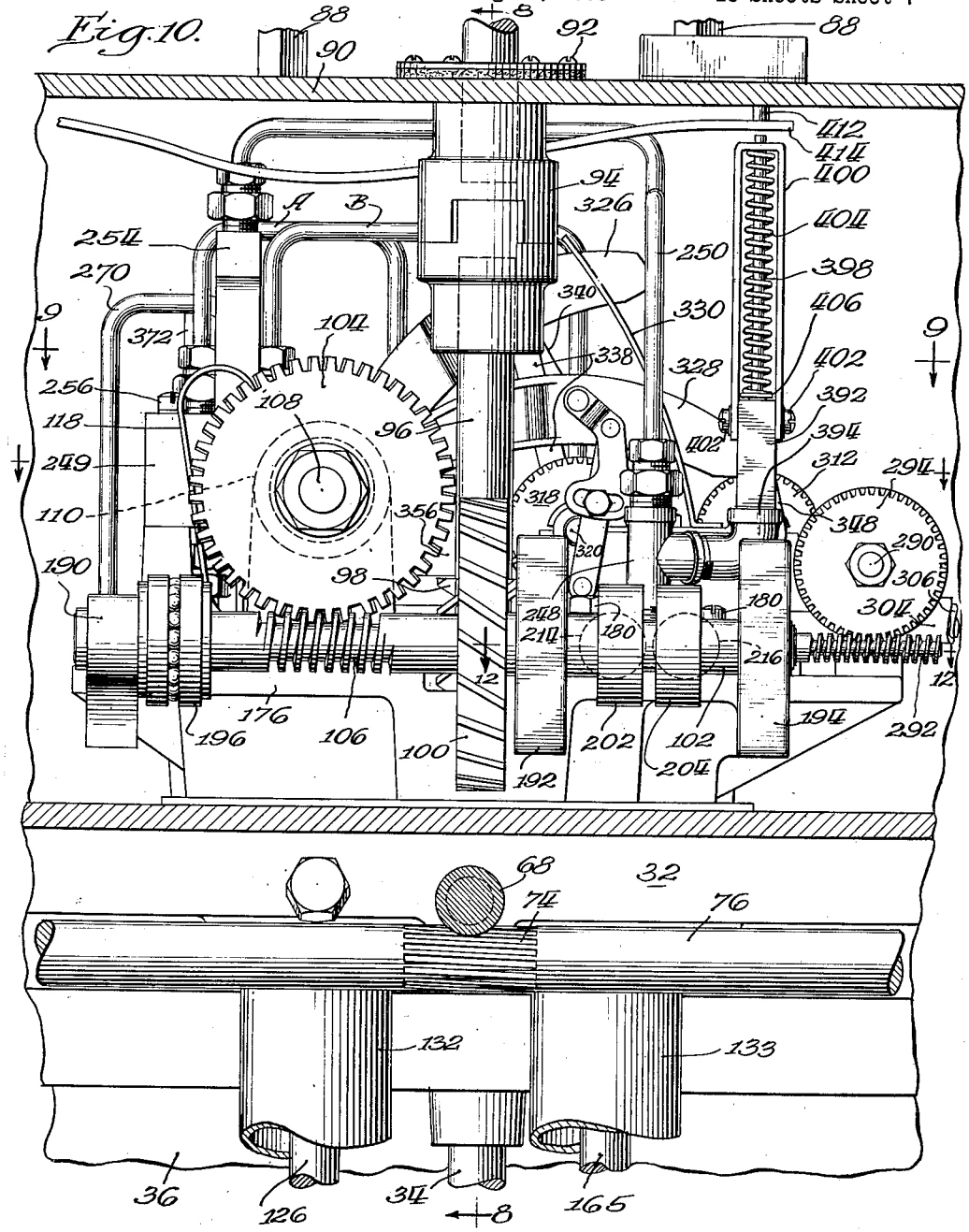
Figure 10 is a vertical sectional view taken on the line 10—10 of Figure 9, showing the drive mechanism and portions of the controlling mechanism thereof in elevation.

The shaft 102 upon which the worm wheel 100 is mounted rotates in bearings formed in brackets 190, 192, and 194 formed as integral parts of the mounting block casting 176, end thrust of the shaft being borne by an end thrust anti-friction bearing 196 (Fig. 10). The bearings 198 and 200 (Figure 12) formed in the brackets 192 and 194 have openings of sufficiently large diameter to permit the installation of the shaft 102 by moving it longitudinally through the bearing openings, the openings being of sufficient size to permit passage of cams 202 and 204, which are secured to the shaft 102 prior to the assembly of this shaft in the mechanism. The shaft 102 is therefore provided with relatively large bearing trunnions 206 and 208 which are rotatable in the bearings 198 and 200 respectively. The cams 202 and 204 are provided for the operation of the high pressure pumping mechanism, which consists of a pair of plungers 210 and 212 provided with follower plates 214 and 216 respectively, which are held in contact with the cams 202 and 204 respectively by compression coil springs 218. The plungers 210 and 212 are reciprocable in high pressure cylinders 220 and 222 respectively, these cylinders being provided with outlet ports 224 and 226. Lubricant is supplied to the cylinders through inlet ports 228 and 230 which communicate directly with the passageway 174 and hence with the pressure accumulating pipe 133. The cams 202 and 204 are angularly offset through an angle of approximately 180° so that the plungers 210 and 212 operate substantially 180° out of phase. The two pumps are provided with a common outlet check valve which is reciprocable in a cylindrical bore 232 extending transversely across the ends of the cylinders 220 and 222 and communicating therewith through the ports 224 and 226. The ends of the bore 232 are threaded to receive hollow plugs 234 forming retainers for springs 236. The springs 236 partially surround extensions 238 formed at the ends of the outwardly projecting stems 240 of a cylindrical slide valve 242 which is freely reciprocable in the bore 232, but is normally maintained in its centermost position closing an outlet port 244, by the springs 236. The outlet port 244 communicates with a vertical bore 246 to which an outlet T 248 (Fig. 10) is secured. It will be understood that as the plungers 210 and 212 are alternately advanced upon their compression strokes, the slide valve 242 will move back and forth from one side of the outlet port 244 to the other side thereof, thus alternately connecting the discharge ports 224 and 226 with the outlet port 244.

In the operation of the lubricating system of my invention, the lubricant under pressure is alternately fed through two conduits leading through common measuring valves. The ends of the conduits are joined in a common return line. It is thus necessary to provide means for pumping lubricant into one of the supply conduits until all of the measuring valves have been supplied with lubricant and until lubricant pressure is built up in the common return conduit. Thereafter, the pump operates idly for a time until the cycle is repeated, supplying the lubricant to the other of the two pressure lines. Thus, for example, designating the outlet conduits as A and B and the return conduit as R (Figure 9), the cycle of operations may be as follows: The pump supplies lubricant under pressure to conduit A until all the measuring valves have been operated and pressure is built up in the return conduit R. Let us assume that this operation consumes fifteen minutes. Further assuming that the bearings are to be lubricated at half hour intervals, the pump will operate idly for a period of fifteen minutes and then supply lubricant under pressure to the conduit B. After operation of the measuring valves consuming a period of about fifteen minutes, pressure will again be built up in the return conduit R and the pump will operate idly for fifteen minutes. At the end of this fifteen minute period, the cycle of operations just described will be repeated. In this illustrative cycle of operations, the total time required for one cycle of operations will be one hour.

The part of the mechanism for controlling the cycling operation of the system comprises a control valve mechanism consisting of a valve block 249 (Figure 13) which is connected to the outlet 246 of the high pressure pump through the connecting T 248 and to an inlet port 252 of the valve block 249 by a conduit 250 (Fig. 9) and an elbow fitting 254. Valve block 249 is secured to the base casting 176 by cap screws 256 and 258 and has a bore 260 extending therethrough for the reciprocation of a double acting slide valve 262. A plunger pressure relief valve 264 is reciprocable in a bore 266 formed in the block 249, the bore 266 communicating with the bore 260 through a connecting port 268. The conduit A communicates with the slide valve bore 260 through a port A1, while the conduit B communicates with this bore through port B1. The return conduit R communicates with the end of the bore 266 through a port R1. A conduit 270 communicates with an extension 272 of the communicating port 268 through inlet port 274. The end of the passageway 272 is closed by a cap screw plug 276. The conduit 270 terminates at the opening 174 leading to the pipe 133 forming a part of the lubricant accumulator. Since the pressure in the latter pipe is low relative to the pressure developed by the high pressure pumping mechanism shown in Fig. 12, the conduit 270 may be considered as a drain for conveying lubricant to the source of lubricant. The relatively small amount of lubricant conveyed through the conduits 270 to the accumulator pipe 133 does not have any appreciable effect upon the operation of the accumulator.

The slide valve 262 is shown in its extreme right-hand position in Figure 13, in which position it will be noted that the lubricant supplied by the high pressure pump may flow outwardly to the port B1, while the port A1 is in communication with the atmosphere through grooves 278 formed in the end of the slide valve 262. When the valve 262 is moved to the left (Figure 13), the outlet A1 will be in communication with the high pressure pump, while the outlet B1 will communicate with the atmosphere through grooves 280 formed in the right-hand cylindrical portion of the slide valve 262. The plunger 262 is provided with head flange 282 which is adapted to be engaged by shoulders 284 and 286 formed on the plunger 264.

The plungers 262 and 264 are adapted to be operated in timed sequence, controlled in part by a power-driven timing mechanism and in part by the pressure of lubricant exerted upon the end of the plunger 264 and supplied from the return conduit R through the port R1. The power-driven timing mechanism comprises a shaft 290 (Figure 9), which is driven by a worm 292 formed on the end of shaft 102 and which meshes with a worm wheel 294 secured to the shaft 290. The shaft 290 terminates in a helical worm gear 296 which meshes with a complementary worm gear 298 secured against rotation with respect to a shaft 300, but longitudinally slidable on said shaft. The helical gear 298 has a hub 302 forming a jaw clutch half which may be engaged by a complementary jaw clutch half 304 secured to a handle shaft 306. Thus if a crank is attached to the shaft 306, the gear 298 may be pushed to the left (Figure 9) against the pressure of a spring 308, and thus disengage the teeth of the gear 298 from the teeth of the worm gear 296, and the shaft 300 may thus be manually rotated.

The shaft 300 (Figure 14) has a helical gear 310 secured thereto for engagement with a complementary helical gear 312 which is secured to a shaft 314. The shaft 300 also has a worm 316 formed thereon for driving a worm gear 318 which is non-rotatably secured to a shaft 320. The shaft 300 has suitable bearings in the base casting 176, including a ball thrust bearing 322 which is lubricated through a passageway 324 formed in the base casting 176. An actuating arm 326 (Figures 9, 13, and 14) is pivoted to the plunger 264, while a similar complementally shaped arm 328 is pivoted to the slide valve 262. The arms 326 and 328 are guided for oscillatory movement about their pivots as well as translatory movement resulting from movement of the plungers 262 and 264 by a guide 330 having slots 332 and 334 for the reciprocation of the forward ends of the arms 326 and 328 respectively. The arms 326 and 328 are oscillated about their pivots by similar linkage trains, each comprising a crank arm 336 secured to one end of the shaft 320 and having its free end pivoted to a link 338. The link 338 is pivoted to the central pivot of a bell crank lever 340, one arm of which is pivotally secured to the actuating arm 326 by a pin 342. The other arm of the bell crank lever 340 is provided with an arcuate slot 344, through which projects an adjusting stud 346 which is threaded in the link 338. By adjusting the position of the bell crank lever 340 with respect to the link 338, the effective length of the link may be varied. The gearing train by which the worm gear 318 is driven constitutes a speed reducing train so that the worm gear 318 may rotate at a speed of one sixtieth of a revolution per minute, or one revolution per hour. The gear 312 rotates several times as fast as the gear 318. The shaft 314 driven by the gear 312, has a pair of dogs 348 fixed thereto, these dogs being adapted to engage the pointed ends of the actuating arms 326 and 328 when the latter are moved to their lowermost positions, substantially to the position in which the arm 328 is shown in Figure 11. The actuating arm is held in this lowered position a sufficient length of time so that it will be engaged by one of the dogs 348 and pushed rearwardly (to the left, Figures 11 and 14) by the dog, thus shifting the positon of the plunger 264 or slide valve 262 which is connected to the particular actuating arm engaged by the dog.

The plunger 264 has a pair of toggle links 350 pivotally secured thereto, the free ends of the toggle links being provided with sidewardly projecting pins 352 which are guided for vertical movement in slots 354 formed in a U-shaped bracket 356. Coil springs 358 are tensioned between the pins 352, and thus tend normally to collapse the toggle linkage, and thereby hold the plunger 264 in one or the other of its two extreme positions, at the end of its stroke. The crank arms 336 extend in diametrically opposite directions from the shaft 320, so that the oscillatory movements of the actuators 326 and 328 are substantially 180° out of phase.

From the above description of the power operated timing mechanism, it will be apparent that the plunger 264 and slide valve 262 will be moved to the left (Figures 13 and 14) alternately. Reviewing the cycle of operation of the control valve mechanism, it will be noted that commencing with the parts in the positions in which they are shown in Figures 11, 13, and 14 (with the exception that the plunger 264 is at the opposite end of its stroke), the first operation will be the engagement of the dog 348 with the actuating arm 328. Such engagement will result in the slow movement of the pivot of the actuator, and hence the slide valve 262 from its limit stop 360, thus shifting the valve 262 from the position in which it is shown in Figure 13 to its other extreme position. During the course of such movement, the flange 282 on the plunger 262 engages the shoulder 284 on the plunger 264 and moves the latter to the position in which it is shown in Figure 13. Under these circumstances, the direct by-passing of lubricant from the port 252 to the passageway 272 is cut off by the plunger 264 so that pressure is built up in the central portion of the bore 260, and lubricant under pressure fed through the port A1 to the conduit A. The plunger 264 and slide valve 262 will remain in the position described until all of the measuring valves have been operated and pressure is built up in the return conduit R. Lubricant from the return conduit will be forced into the end of the plunger cylinder 266 (the end of the plunger being suitably formed so that lubricant may flow into the cylinder 266 irrespective of the position of the plunger 264), and when the pressure in this bore is built up sufficiently to overcome the tension of the toggle springs 358, the plunger 264 will snap to the right (Figure 13), thus permitting the lubricant supplied through the port 252 from the high pressure pumping mechanism to by-pass to the conduit 274. As the plunger 264 moves to the right, its shoulder 284, being adjacent the flange 228, will engage the latter and return the slide valve 262 to the position in which it is shown in Figure 13.

These parts will remain in the last described positions until the actuating arm 326 is moved toward its lowermost position by the rotation of its crank arm 336, in which position its pointed extremity will be engaged by the dog 348, which is in alignment therewith, and the actuating arm 326 will thus be pushed rearwardly (to the left, Figures 13 and 14), overcoming the tension of the toggle linkage spring 358, and ultimately causing the plunger 264 to snap back into the position in which it is shown in Figure 13. It will be apparent that after the end of the plunger passes the passageways 268, 272, a certain amount of lubricant will have to be displaced from the end of the bore 266 to permit further leftward movement of the plunger 264. Such further movement is permitted by virtue of the fact that the return conduit R is connected to a pressure relief fitting 362 (Fig. 15) by a T 364. The fitting 362 has a cylindrical bore 366 in which a plunger 368 is freely reciprocable, being normally held in the lowermost position shown in Figure 15 by a relatively weak compression coil spring 370 which is compressed between the upper end of a yoke 372 and a washer 374 resting upon a shoulder 376 formed on the plunger 368. A relatively powerful coil spring 378 is compressed between the upper end of the yoke 372 and a washer 380, which rests upon a pair of lugs 382 formed integrally with the yoke 372. The toggle linkage spring 358 is sufficiently powerful to create a high enough pressure in the return line to cause compression of the relatively weak spring 370 as the plunger 368 is raised, and the displacement of the plunger 368 as it moves against the compression of the spring 370 is sufficient to provide space for the lubricant which is displaced from the end of the bore 266 by the plunger 264. The movement of the plunger 368 in receiving such displaced lubricant is not, however, sufficient to cause the upward movement of the plunger 368 to a height where the washer 374 will engage the washer 380.

Because of the clearance between the shoulders 284 and 286, the position of the slide valve 262 will not be affected by the leftward (Figure 13) movement of the plunger 264, and the latter will therefore remain in the position in which it is shown in Figure 13. Lubricant under pressure will therefore be supplied through the port B1 to the conduit B and hence to the measuring valves until all of them have been operated and the pressure again builds up in the return conduit R. As the pressure builds up in this conduit, the plunger 368 (Figure 15) will be raised against the pressure of the spring 370 until the washer 374 abuts against the washer 380, and thereafter the plunger will move upwardly against the combined forces of the springs 370 and 378. The plunger 368 and its associated parts thus act as a pressure accumulator storing energy until a sufficiently high pressure is finally attained in the conduit R to cause movement of the plunger 264 against the forces exerted through the spring toggle linkage 350, 358.

As soon as the plunger 264 commences moving to the right, (Figure 13) the plunger 368 will be forced downwardly to maintain a relatively high pressure in the return conduit R and thus cause rapid movement to the right of the plunger 264 with a desirable snap action.

After the plunger 264 has moved to the right, the lubricant supplied by the high pressure pumping mechanism is again by-passed through the passageways 268, 272, and the conduit 270 and the pump will operate ineffectively until the actuating arm 328 is again lowered to a position where it is engaged by its dog 348. The cycle of operations is thus completed.

Since leakage of lubricant under pressure from the passageway 268 to the inner end of the plunger cylinder 266, when the plunger is in the position in which it is shown in Figure 13, might cause the plunger to be forced outwardly (to the right, Figure 13), a trapping groove 390 is provided in the plunger 264. This groove is so arranged that any lubricant leaking from the passageways 268 in a direction toward the adjacent end of the plunger will be intercepted and flow along the groove into the passageway 272, from which it may escape through the drain conduit 270.

A pressure relief device is connected to the T 248 which forms the outlet passageway for the high pressure pumping mechanism. This device comprises a body 392 (Figures 10 and 11) connected to the T 248 by an elbow 394. The cylinder body is bored to receive a plunger 396 which has a stem 398 of reduced diameter guided in a yoke 400, which is secured to the body 392 by cap screws 402. An initially compressed coil spring 404 is held between the upper end of the yoke 400 and a washer 406 resting on a shoulder formed on the plunger 396. A vent port 408 is formed in the side of the cylinder body 392 so that when the lubricant pressure at the outlet of the high pressure pumping mechanism becomes excessive, the plunger 396 will be raised against the force of the spring 404 until it uncovers the port 408 and thereby relieves the pressure which otherwise might be built up to a value so high as to damage parts of the mechanism. Of course the only time that the plunger 396 will be raised will be when some part of the mechanism is not functioning satisfactorily. It is therefore imperative that the attendant be apprized of such improper functioning of the apparatus, and for this purpose, I provide a suitable signal, preferably electrically operated, which is controlled by the plunger 396. In Figure 11, this signaling apparatus is illustrated as being capable of being controlled by a circuit which includes a pair of switch contacts 410 which are arranged to be pressed together to complete the circuit by a pin 412 carried at the end of a long bar 414. The bar 414 is sufficiently flexible that when the plunger 396 is raised sufficiently it will engage the lower surface of the end of the bar and flex it upwardly to cause the pin 412 to close the switch contacts 410. Since the type of signaling device may be varied to suit conditions encountered in individual installations of the apparatus, such signal device is not illustrated herein. However, it may be in the form of an electrically operated bell or other sound producing device, or may be a visual signal, such as a red lamp which is illuminated when the switch 410 is closed. The signal is adapted to be operated not only when the pressure at the outlet of the high pressure pumping mechanism is excessive, but also when the lubricant drum becomes empty. Under the latter conditions, the priming pump will, of course, operate without obstruction by the lubricant, and hence the priming piston 142 will complete a full stroke with each revolution of the crank 112, and the spring 134 will maintain the connecting rod head 120 in engagement with the roller 116 throughout the cycle of revolution. The strap 118 will thus, during the uppermost position of its cycle of revolution, engages the bar 414, which is bent downwardly so as to lie in the path of movement of the upper end of the strap 118. Thus, when the lubricant drum is empty, the strap 118 will push the bar 414 upwardly and close the switch contacts 410 once during each revolution of the crank 112. The periodic ringing of the bell or periodic operation of any other signal which may be controlled by the switch 410 will thus apprize the attendant that the drum is empty, whereas a continuous ringing of the bell or continuous operation of another type of signal which may be controlled by the switch 410 will inform the attendant that the mechanism is not functioning properly and requires attention.

The above described pumping and timing mechanism is particularly adapted for use as a component part of a lubricating system diagrammatically shown in Figure 25 and incorporating measuring valves of the types shown in Figures 17 to 23 inclusive. Two different types of measuring valves are shown in the enumerated figures. The type shown in Figures 17 to 20 comprises a generally cylindrical body 420 having a large central bore 422 extending longitudinally thereof and a small diameter valve cylinder 424. A pair of outlet passageways 426 and 428 communicates with the central bore 422 through ports 427 and 429 respectively, while the valve cylinder 424 communicates with the central bore 422 through ports 430 and 431. A valve 432 is slidable in the valve cylinder 424, and has heads 434 and 436 which are arranged to control the flow of lubricant through the ports 430 and 431 respectively, as well as to control outlet ports 438 and 440. The body 420 has similar heads 442 and 444 secured thereto, suitable gaskets being provided to seal the connection, the heads being secured to the body by cap screws 446. The body 442 has a longitudinal bore 448 which communicates with the valve cylinder 424 through a sidewardly opening port 450. Similarly, the upper end of the bore 448 communicates with the passageway 428 through a port 452. The flow of lubricant through the bore 448 in one direction (upward, Figure 17) is prevented by a check valve 454, which is confined in a cage 456, the latter being secured to the bore 448 by a press fit. The movable check valve body is made relatively long and of very nearly the diameter of the bore within the cage 456, so that the check valve will be responsive to slow flow of lubricant due to the fact that the friction between the lubricant and the check valve body will cause the body to be forced to its seat upon the slightest tendency toward flow of lubricant past the check valve in one direction. The head 444 is similarly provided with a check valve 458, a longitudinal bore 459, and ports 460 and 462 communicating with the valve cylinder 424 and passageway 426 respectively.

Freely reciprocable within the central bore 422 is a plunger 464, the ends of which are turned to a reduced diameter so as not to cover ports 430 and 431. Lubricant is adapted to be supplied to the heads 442 and 444 respectively in the direction of the arrows through supply conduits B and A. As shown in Figure 25, the measuring valves have their outlet ports 438 and 440 connected by branch conduits 465 to parts 466 to be lubricated. Referring to Figure 17, with the parts of the measuring valve in the positions there shown, the valve is in a condition to receive lubricant under pressure from the conduit B. Upon application of pressure to the lower end of the bore 448, the check valve 454 will, of course, immediately close, and the valve 432 will be forced to the left since, when the lubricant in the conduit B is under pressure, the conduit A is vented by the control valve mechanism previously described. It will be noted that the ends of the valve 432 have reduced diameter portions so as not completely to obstruct the bores 448 and 459. After the valve 432 has been forced to the leftmost position by the lubricant pressure, its head 436 will close the port 440, leading to one of the bearings to be lubricated, and uncover the port 431, thus admitting lubricant under pressure to the right hand end of the measuring cylinder 422. Lubricant will flow into the cylinder, forcing the measuring valve plunger 464 to the left end of its stroke, in which position the port 429 will be uncovered and permit lubricant to flow outwardly through the passageway 428, and the continuation of the conduit B to the next measuring valve in series. As the measuring valve plunger 464 moves to the left, the lubricant trapped in the cylinder ahead of the plunger is forced outwardly through the port 430, which, due to the fact that the valve 436 is in its leftmost position, will be in communication with the outlet port 438, and hence the lubricant displaced by the plunger 464 will be forced to the part 466 to be lubricated. The leftward movement of the valve 432 causes displacement of a certain quantity of lubricant into the bore 459. Since all of the passageways and bores of the measuring valve are normally filled with lubricant, such leftward movement of the measuring valve would be impossible without the provision of the check valve, such as 458 and 454, in each of the measuring valves. These valves permit backward flow (in a direction opposite the arrows in the conduit A.)

After all of the measuring valves have been operated, the pressure in the conduit B will drop, due to the venting of this conduit to the conduit 270 by the control valve mechanism, as previously described, and instead, the lubricant in conduit A will be placed under pressure. Under these circumstances, the valve 432 will be forced to the right, and the plunger 464 returned to its rightmost position, as shown in Figure 17, forcing lubricant through the port 431 and port 440 to its associated bearing or other part to be supplied with lubricant.

In instances where a large number of different parts are each to be supplied with a measured quantity of lubricant, and such parts are grouped in a limited area, a multiple measuring valve of the type shown in Figures 21, 22, and 23, may be utilized. Such multiple measuring valve consists of a body 470 having heads 472 and 474. The heads have longitudinally extending passageways 473 and 475, respectively, which form part of the pressure conduit lines A and B respectively. The body 472 is provided with a plurality of measuring cylinders 476, each containing a measuring plunger 478, and a plurality of valve cylinders 480, each containing a slide valve 482. The extent of the reciprocatory strokes of the valve plungers 478 are limited by the set screws 484 which are threaded in the head 474 and project into the measuring cylinders 476 varying distances, depending upon the lubricant requirements of the particular bearing with which such measuring cylinder is associated. The set screws are frictionally held in adjusted position by a piece of heavy spring wire 486, the ends of which are hooked about the end set screws and the intermediate portion of which is woven back and forth between successive set screws so that a certain amount of spring pressure is exerted upon each of the set screws to hold it in its adjusted position. The head 474 is provided with hollowed plugs 488 which may be unscrewed to obtain access to the set screws 484 whenever it becomes necessary to adjust them. The valve cylinder 480 is connected with the measuring cylinder 476 by ports 490 and 491, while the valve cylinder is adapted to be connected to parts to be lubricated through ports 492 and 493. The ends of the valve cylinder 480 communicate respectively with the bores 473 and 475 formed in cap manifolds 472 and 474 through suitable ports 494 and 495, respectively.

For convenience of installation, the ports 492 and 493 may be located upon opposite sides of the body 470, and are connected by branch conduits 496 to parts to be lubricated. When a plurality of multiple measuring units, such as shown in Figures 21 and 22, are to be connected in series, the outlet end of each of the manifold caps 472, 474, is provided with a check valve housing 498, within which is located a spring pressed ball check valve 500. The springs 502, which press the valves 500 to their seats, are preferably relatively strong so as to resist opening under lubricant pressures as high as 1000 pounds per square inch. By virtue of this high resistance to flow of lubricant from the manifold caps 472, 474, assurance will be had that all of the measuring devices within the unit will have been operated completely before lubricant is permitted to flow to the next multiple unit measuring valve. The last multiple unit measuring valve in a series will, of course, have its check valve fitting 498 replaced by pipe plugs to prevent escape of lubricant from the unit. Because of this arrangement, the multiple measuring valve units need not be connected in series in the conduits A and B, but may be connected in branches from these conduits.

Figure 9:
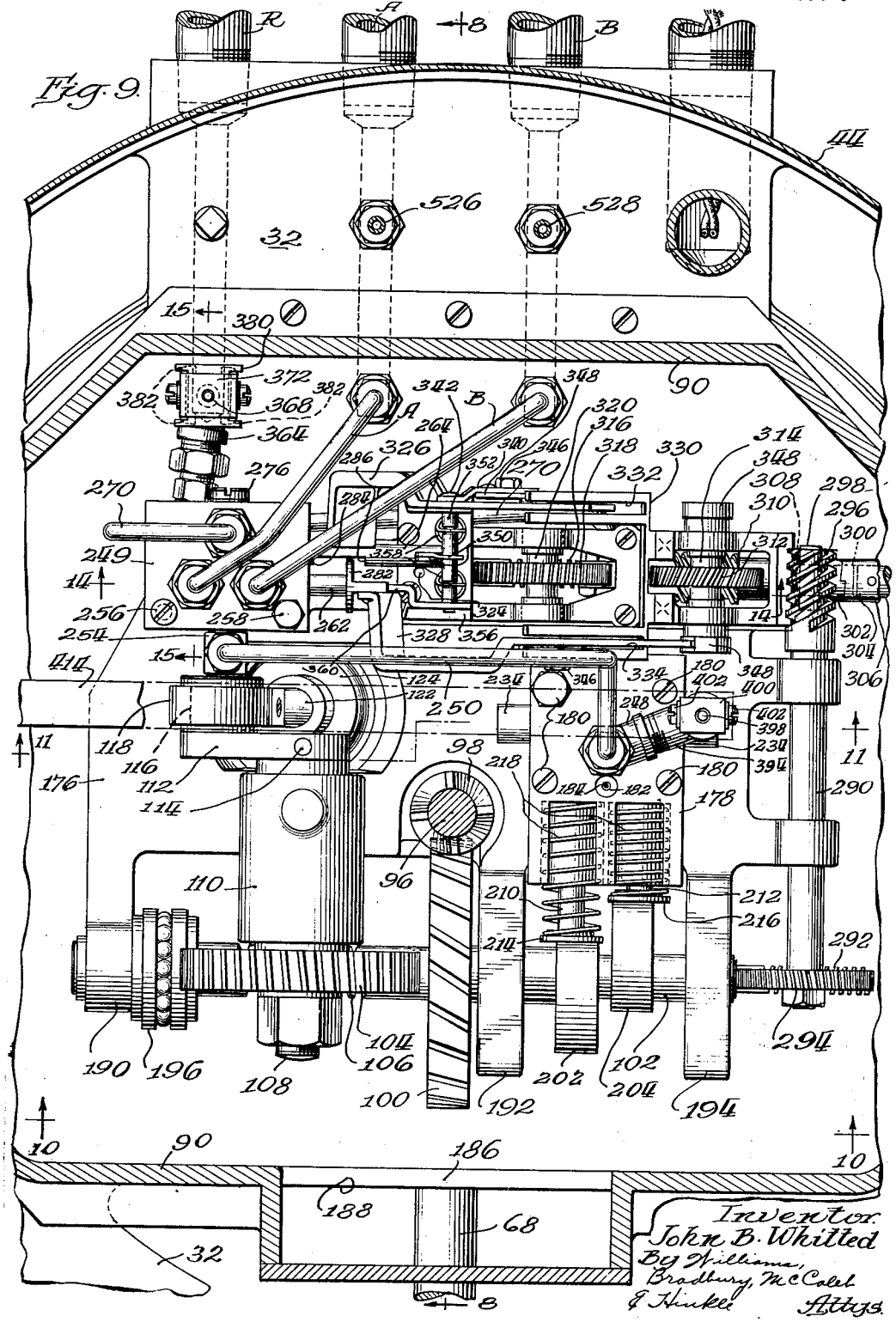
Figure 9 is an enlarged plan section taken on the line 9—9 of Figure 10, showing particularly the compressor drive mechanism and the compressor timing control apparatus.

Referring to Figures 1, 2, 8, and 16, means are provided to indicate the pressure in the conduits A and B, and to indicate in which conduit the lubricant is under pressure. This means comprises a pressure gauge 506 which is directly connected to a plunger cylinder 508, as indicated in Figure 8. The cylinder 508 may be vented to the lubricant supply drum through a conduit 510 and a shut off valve 512, as indicated in Figure 16. A plunger 514 is freely reciprocable in the cylinder 508 and has a stem 516 (Figures 8 and 16) which operates an arm 518 connected to a suitable counter 520. The cylinder 508 has inlet ports 522 and 524 which are connected by suitable conduits 526 and 528 respectively with the pressure lines A and B (Fig. 9). Thus, when lubricant is supplied through the pressure line A, the plunger will be moved forwardly to the position in which it is shown in Figures 8 and 16, and the pressure gauge 506 will indicate the pressure in the line A. Upon reversal of these conditions, when the pressure is applied to line B, the plunger 514 will be moved to its opposite position, actuating the counter 520, and connecting the pressure gauge 506 to the line B through the port 524 and conduit 528. In order to check the gauge, the valve 512 may be opened to relief pressure, thus venting the plunger cylinder 508 to the supply drum.

In the foregoing detailed description of the invention, the method of operation of the various parts is quite fully described, and a brief résumé of the operation of the apparatus as a whole will suffice to correlate the descriptions of the operation of the individual elements.

Having placed a drum of lubricant upon the support 48 and raised it by means of the manually operated elevating mechanism, the operation of the apparatus may be started by closing a switch which supplies the electric motor 86 with power. The priming pump mechanism 66 thereupon commences operation and supplies lubricant under pressure to the high pressure lubricant pumping mechanism shown in detail in Fig. 12. This lubricant under pressure will be supplied either to the pressure line A or pressure line B, depending upon the position of the automatic control valve mechanism shown in Fig. 13. Pressure in either one of the pressure lines A or B will cause successive operation of the measuring valves located along the pressure lines, and upon operation of each of the measuring valves, it will supply lubricant to one of its two associated bearings or other parts requiring lubrication. After all of the measuring valves have been operated, pressure will be built up in the return conduit R, which will result in the operation of the plunger 264 to a position in which lubricant from the high pressure pump is by-passed to the lubricant pressure supply through passageways 268, 272, 274, and the conduit 270. Dissipation of this back pressure in the return conduit R by a return flow past the check valves 454 or 458 in the conduit which is not under pressure, is prevented by virtue of the fact that these check valves offer high resistance to flow of lubricant past them. The cumulative effect of a plurality of these check valves in series is sufficient to prevent any return flow of lubricant through the conduit not under pressure, so that the pressure in the return conduit R is not appreciably lowered by any leakage which may take place through the path which includes these check valves. This operation of the plunger 264 is rendered rapid, and its operation through a full stroke assured by the pressure accumulator device shown in Figure 15. After a predetermined interval, the actuating arm 328 will be engaged by its operating dog 348 and the slide valve 262 operated to connect the conduit B to the high pressure pumping mechanism, at the same time shifting the plunger 264 to close the by-pass. The particular timing of these operations may be changed for any particular installation by changing the gear ratios of the gearing which drives the gear 318.

Upon supply of lubricant under pressure to the conduit B, the measuring valves will operate in a direction opposite to that in which they operated on the previous part cycle, and lubricant will be supplied to the other group of bearings which are connected to the measuring valves. After all of the measuring valves have thus been operated, lubricant under pressure in the return line R will be effective to move the plunger 264 outwardly, and thus again condition the device for the commencement of the next cycle of operation. With this apparatus, it will thus be apparent that a large number of bearings or other parts may be periodically supplied with individually measured charges of lubricant. The arrangement is such that approximately one half of the total number of bearings is supplied with lubricant during the first half cycle of operation, and the other half of the bearings are supplied with lubricant during the latter half cycle of operation.

From the foregoing description, it will be apparent that I have provided an improved apparatus for alternately supplying to a pair of measuring valve feed lines, lubricant under pressure, timing the intervals at which the device operates to supply the lubricant under pressure to the measuring valve lines, and cutting off the supply of pressure to the lines as soon as all of the measuring valves connected thereto have been supplied with lubricant. In addition to the improved lubricant supply system, I have provided improved means for indicating and controlling the operation of the apparatus, by showing at all times the pressure in the respective discharge lines and by counting the number of lubricating operations. As further controls for the apparatus, I have provided means for indicating when the supply of lubricant for the apparatus is exhausted and for indicating when there is a stoppage or other defect in the pressure line which causes the pressure to rise abnormally. Furthermore, I have provided improved forms of measuring valves usable in conjunction with the pressure supply apparatus to provide a lubricating system which will be effective periodically to supply accurately measured charges of lubricant to a large number of bearings or other parts requiring lubrication. The action of the system, with the exception of the replenishment of the lubricant supply, is substantially wholly automatic, is adjustable to meet the requirements of any particular installation, can be enlarged to supply additional bearings without appreciable alteration in the system as a whole. The apparatus can be easily and quickly replenished with a full lubricant supply drum, in which the operating parts are adequately lubricated, and the apparatus as a whole is durable and very economical when used in installations where a relatively large number of bearings are required to be periodically lubricated.

While I have shown and described a particular embodiment of my invention, it will be apparent to those skilled in the art that numerous modifications and alterations may be made in the particular construction shown without departing from the more fundamental principles of the invention. I therefore desire in the accompanying claims to include within the scope of my invention all such modifications, variations, and alterations by which substantially the results of the invention may be obtained by the substantially same or equivalent means.

I claim:

1. In a centralized lubricating system for a plurality of parts requiring lubrication, the combination of a spring operated priming pump, a pressure accumulator receiving lubricant from said priming pump, a high pressure pump having its inlet connected to said accumulator, a pair of pressure lines for supplying lubricant to measuring valves, and means for alternately connecting the outlet of said high pressure pump to said pressure lines, said means comprising a by-pass controlling plunger, a slide valve, means for periodically moving said slide valve in one direction, and means including said plunger for moving said slide valve in the opposite direction.

2. In a high pressure lubricating system for a plurality of bearings, the combination of a priming pump, a high pressure pump receiving lubricant from said priming pump arranged to discharge lubricant under pressure, a control valve mechanism connected to the discharge of said high pressure pump and having means for controlling the flow of lubricant from said pump alternately to a pair of conduits for supplying lubricant to measuring valves, said means including a slide valve, an arm for actuating said slide valve in one direction, said arm being pivoted to said slide valve, a linkage for swinging said arm relative to said slide valve, and power operated means engaging said arm when in one of its two extreme positions of oscillatory movement to move the latter in a direction at an angle to its path of oscillatory movement, thereby to shift said slide valve.

3. In an intermittently effective lubricant pressure supply apparatus for centralized lubricating systems, a lubricant supply conduit and a return conduit, the combination of a source of lubricant under pressure, a valve operable to connect said source with said lubricant supply conduit, a cylinder having one end thereof connected to said return conduit, a plunger reciprocable in said cylinder, and a lost motion connection between said plunger and said valve to cause movement of said valve in a direction to divert the supply of lubricant from said supply conduit when said plunger is moved by lubricant pressure supplied through said return conduit.

4. In an intermittently effective lubricant pressure supplying apparatus for centralized lubricating systems, a lubricant supply conduit and a return conduit, the combination of a source of lubricant under pressure, a valve operable to connect said source with said lubricant supply conduit, a cylinder having one end thereof connected to said return conduit, a plunger reciprocable in said cylinder, a lost motion connection between said plunger and said valve to cause movement of said valve in a direction to divert the supply of lubricant from said supply conduit when said plunger is moved by lubricant pressure supplied through said return conduit, a cylinder, and a spring pressed plunger connected to said return conduit.

5. In a lubricating system of the type in which lubricant under pressure is alternately supplied to two conduits having a common return conduit, the combination of a lubricant pump, a first valve for automatically connecting said pump to discharge into one or the other of said conduits, a second valve operated in one direction by lubricant pressure in said return conduit to by-pass lubricant from said pump around said pressure conduits, a lost motion operating connection between said valves for operating said first valve in the same direction, and timing means for alternately operating said valves in the opposite direction.

6. In an intermittently effective lubricant-pressure-supplying apparatus for centralized lubricating systems including a lubricant supply conduit and a return conduit and a source of lubricant under pressure, the combination of a valve operable to connect said source with said lubricant supply conduit, a cylinder having one end thereof connected to said return conduit, a plunger reciprocable in said cylinder, a resilient quick snap-over device for moving said plunger from its dead-center position, a lost-motion connection between said plunger and said valve to cause movement of said valve in a direction to divert the supply of lubricant from said supply conduit when said plunger is moved by lubricant pressure supplied through said return conduit, and a resilient storage reservoir connected to said return conduit adjacent said valve and of capacity approximating the displacement of said plunger.

7. In an intermittently effective lubricant-pressure-supplying apparatus for centralized lubricating systems including a lubricant supply conduit and a return conduit and a source of lubricant under pressure, the combination of a valve operable to connect said source with said lubricant supply conduit, a cylinder having one end thereof connected to said return conduit, a plunger reciprocable in said cylinder, a resilient quick snap-over device for moving said plunger from its dead-center position, a lost-motion connection between said plunger and said valve to cause movement of said valve in a direction to divert the supply of lubricant from said supply conduit when said plunger is moved by lubricant pressure supplied through said return conduit, a resilient storage reservoir connected to said return conduit adjacent said valve and of capacity approximating the displacement of said plunger, and timing means for operating said plunger in the opposite direction.

8. In an intermittently effective lubricant-pressure-supplying apparatus for centralized lubricating systems including a lubricant supply conduit and a return conduit and a source of lubricant under pressure, the combination of a valve operable to connect said source with said lubricant supply conduit, a cylinder having one end thereof connected to said return conduit, a plunger reciprocable in said cylinder, a resilient quick snap-over device for moving said plunger from its dead-center position, a lost-motion connection between said plunger and said valve to cause movement of said valve in a direction to divert the supply of lubricant from said supply conduit when said plunger is moved by lubricant pressure supplied through said return conduit, and a resilient storage reservoir connected to said return conduit adjacent said cylinder and of capacity approximating the displacement of said plunger.

9. In a pumping apparatus for lubricating systems in which lubricant under pressure is to be periodically supplied alternately to a pair of conduits, a high pressure pumping mechanism, a directional valve for connecting the lubricant supplied under pressure by said mechanism alternately to said conduits, a pressure responsive valve, arms pivoted to said valves respectively, motor operated timing means, connections between said means and said arms for slowly oscillating said arms through a substantial angular distance in appreciably differing phase, and valve actuating means driven by said timing mechanism and having relatively rapidly moving parts engageable with said arms during short portions only of their oscillatory cycles, thereby to move said valves.

10. In a pumping apparatus for lubricating systems in which lubricant under pressure is to be periodically supplied alternately to a pair of conduits, a high pressure pumping mechanism, a directional valve for connecting the lubricant supplied under pressure by said mechanism alternately to said conduits, a pressure responsive valve, arms pivoted to said valves respectively, motor operated timing means, connections between said means and said arms for slowly oscillating said arms through a substantial angular distance in appreciably differing phase, valve actuating means driven by said timing mechanism and having relatively rapidly moving parts engageable with said arms during short portions only of their oscillatory cycles, thereby to move said valves, and a lost motion connection whereby said pressure responsive valve moves said directional valve in a direction opposite to that in which it is moved by one of the parts of said valve actuating means.

11. In a lubricant system of the type in which lubricant under pressure is alternately supplied to the two conduits having a common return conduit, the combination of a lubricant pump, a first valve for automatically connecting said pump to discharge into one or the other of said conduits, a second valve operated by lubricant pressure in said return conduit to by-pass lubricant from said pump around both of said conduits, and timing means for alternately operating said valves.

JOHN B. WHITTED.